United States Patent [19]

Deily

[11] 3,770,947
[45] Nov. 6, 1973

[54] TOOL CONTROL
[75] Inventor: Don Deily, Lexington, Mass.
[73] Assignees: City National Bank of Detroit, Detroit, Mich.; Robert C. Fisher
[22] Filed: Aug. 20, 1971
[21] Appl. No.: 173,408

[52] U.S. Cl............. 235/151.11, 235/152, 318/572, 318/573
[51] Int. Cl............................................. G06f 15/46
[58] Field of Search...................... 235/151.11, 152; 318/567, 569-570, 572-574

[56] References Cited
UNITED STATES PATENTS
3,148,316  9/1964   Herchenroeder.................. 318/570
3,555,253  1/1971   Seki............................. 235/151.11
3,416,056  12/1968  Motooka et al. .................. 318/573
3,423,656  1/1969   Tripp................................ 318/570
3,500,150  3/1970   Foster............................... 318/572

Primary Examiner—Eugene G. Botz
Assistant Examiner—Jerry Smith
Attorney—John N. Williams

[57] ABSTRACT

System for control of tool drive with respect to at least X and Y axes to trace a first path segment and to approach a second path segment (e.g., for tool offset, or to trace an inscribed curve tangent to the two path segments), by steps comprising storage of data descriptive of X and Y positions corresponding to current X and Y tool positions and of a first function the value of which is dependent upon the perpendicular distance from the X and Y positions to the second path segment, updating of the stored data upon advance of the drive during the tracing of the first path segment, and interruption of the tracing of the first path segment when the function assumes a predetermined value.

8 Claims, 23 Drawing Figures

INVERTER

NAND GATE (INVERTER AND)

NOR

FLIP FLOP

SIMPLE FLIP FLOP

TOOL CONTROL

BACKGROUND OF THE INVENTION

1. Field of the Invention

This invention relates to control of driven tools.

2. Description of the Prior Art

The invention is particularly applicable to machine tool control where account must be taken of tool width to cause the cut produced by the tool to lie on the waste side of the desired tool path. Tool compensation is complicated when the required direction of offset changes at the intersection of path segments (e.g., the intersection of linear segments at an angle, or the intersection of circular arc segments having different centers, or the intersection of linear with circular arc segments). Some systems (e.g., U.S. Pat. No. 3,120,603) employ rotation of the tool to cause the direction of offset to remain constant with respect to the tool. Some others (e.g., U.S. Pat. No. 3,430,121) employ multiple computations of actual path coordinates with and without the offset. The invention is also applicable to tracing inscribed curves tangent to two path segments (e.g., to round corners); typically in the art, the two points of tangency must be calculated.

Summary of the Invention

In general, the invention features a system for control of tool drive with respect to at least X and Y axes to trace a first path segment and to approach a second path segment, by steps comprising storage of data descriptive of X and Y positions corresponding to current X and Y tool positions and of a first function the value of which is dependent upon the perpendicular distance from the X and Y positions to the second path segment, updating of the stored data upon advance of the drive during the tracing of the first path segment, and interruption of the tracing of the first path segment when the function assumes a predetermined value. In preferred embodiments the interruption occurs when the value of the function changes its algebraic sign; the means for updating operates without recalculation of the function, by applying rules relating changes in the function to changes in X and Y; and the system further comprises storage of additional data descriptive of a second function the value of which is dependent upon the perpendicular distance from current tool position to the first path segment, updating of the additional data upon advance of the drive during the tracing of the first path segment, and controlling the advance so that the value of the second function tends toward a predetermined constant value corresponding to the desired offset. In some preferred embodiments the predetermined value corresponds to a desired tool offset for the second path segment, and the X and Y positions are the current tool positions. In other preferred embodiments, for tracing an inscribed curve tangent to first and second path segments, the X and Y positions are pseudo tool positions on a pseudo path segment parallel to the first path segment and intersecting the center of an inscribed curve to be traced tangent to the first and second path segments, and the predetermined value corresponds to the distance between the first and pseudo path segments. The invention is realizable as a special computational unit, a method, or a computer program.

The invention thus provides economical, high speed, accurate, compensated tool control without requiring actual computation of the intersection of successive compensated path segments, or of the actual points of tangency of an inscribed curve, all with great simplification of the required software.

Other features and advantages of the invention will be apparent from the description and drawings herein of a preferred embodiment thereof.

DESCRIPTION OF THE PREFERRED EMBODIMENT

Figure 1:
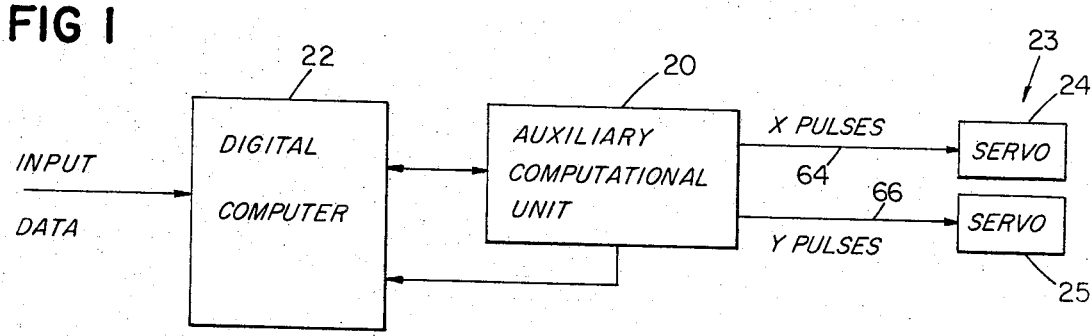
FIG. 1 is an overall block diagram of the invention.

Referring to the drawings, an auxiliary computational unit 20 is connected between a programmed digital computer 22 and an X–Y tool drive 23 including digital servos 24, 25 for relative tool-workpiece motion along X and Y axes, respectively.

Figure 2:
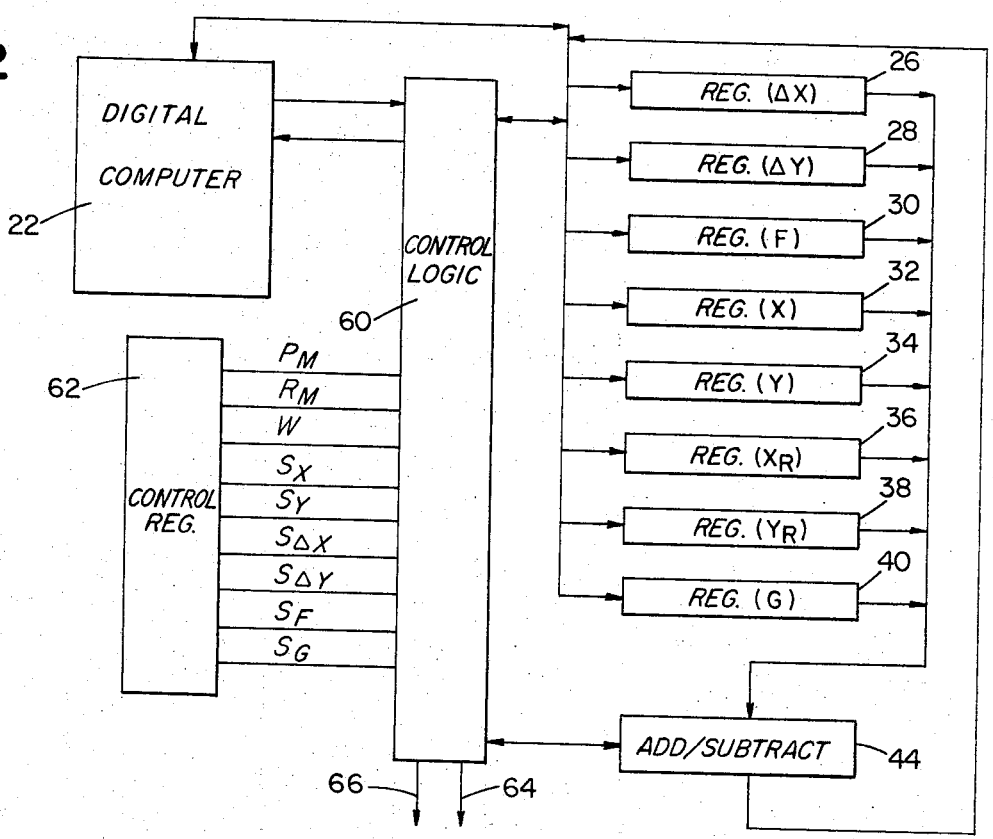
FIG. 2 is a more detailed block diagram.

Unit 20 consists of registers 26–40 (FIG. 2) adder/subtracter 44, and control logic 60 with associated register 62. Output lines 64 and 66 from logic 60 respectively provide X and Y stepping pulses to servos 24, 25.

Figure 3:
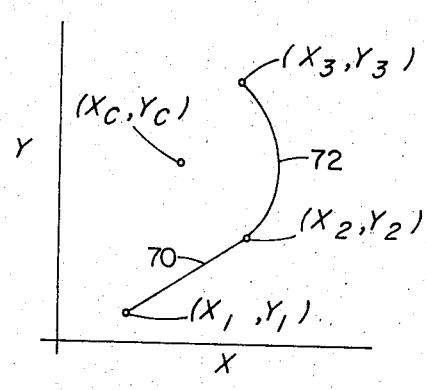
FIG. 3 is a diagram showing two path segments to be traced in an X–Y coordinate system.
Figure 4:
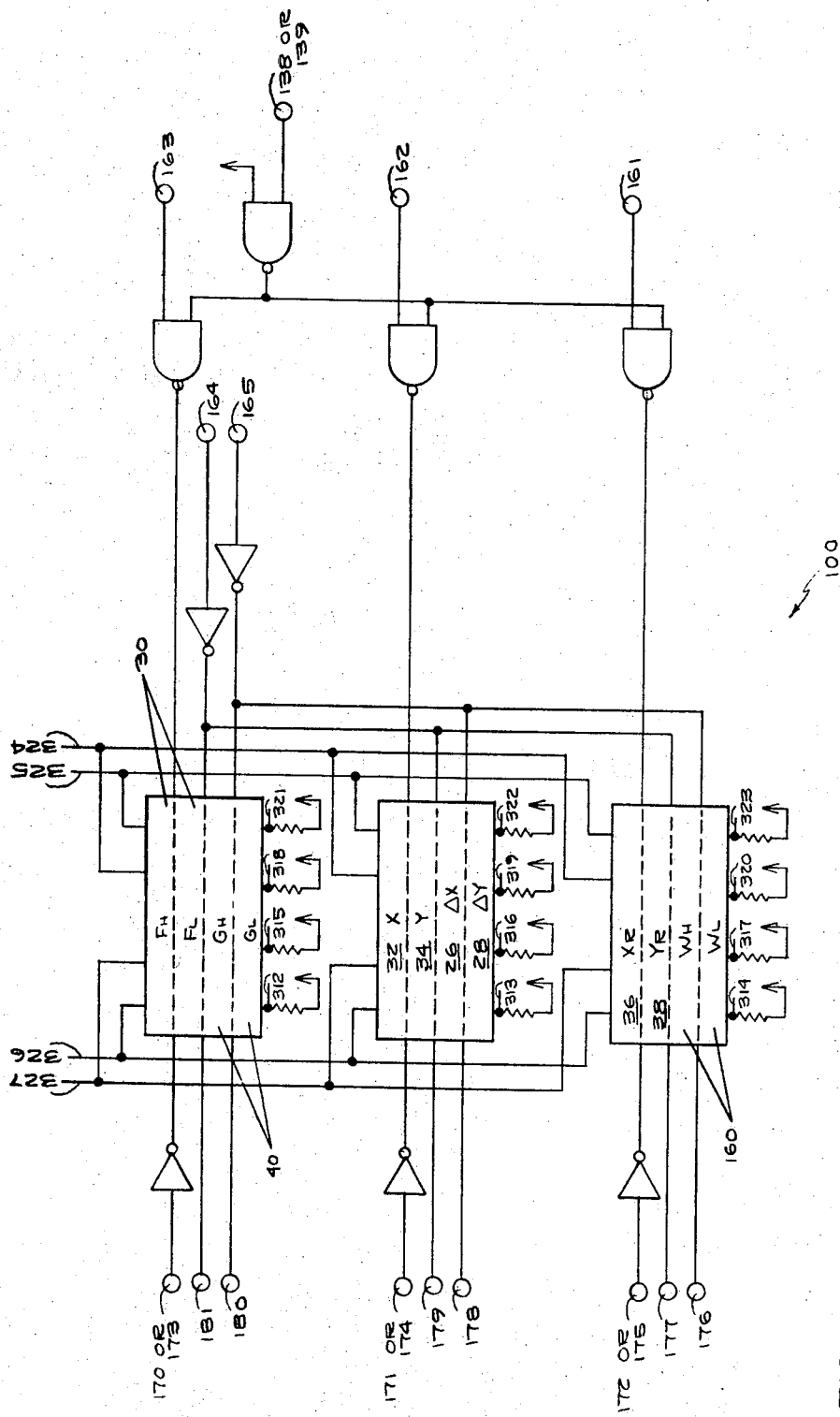
FIGS. 4–21 are circuit diagrams of portions of an interpolator embodying the invention.

The system is an interpolator designed to control tool movement along successive path segments which are either linear or circular. Considering such movements on an X–Y grid, with points limited to integers, a linear path segment 70 (FIG. 3) extending between points $(X_1, Y_1)$ and $(X_2, Y_2)$ is described by the following equation:

$$\Delta X \cdot Y - \Delta Y \cdot X + (X_1 \cdot Y_2 - X_2 \cdot Y_1) = 0 \quad (1)$$

where $\Delta X = X_2 - X_1$ and $\Delta Y = Y_2 - Y_1$.

A function F can be defined which has a constant value at a fixed perpendicular distance from the linear segment, for all points along the segment:

$$F = \Delta X \cdot Y - \Delta Y \cdot X + (X_1 \cdot Y_2 - X_2 \cdot Y_1) \quad (2)$$

Similarly, for a circular arc path segment 72 extending between points $(X_2, Y_2)$ and $(X_3, Y_3)$, with a radius of curvature R about a center $(X_C, Y_C)$, a corresponding function F will have a constant value (zero on the segment) at a fixed distance from the center of curvature (and hence a fixed perpendicular distance from segment 72):

$$F = (X - X_C)^2 + (Y - Y_C)^2 - R^2 \quad (3)$$

The F functions can be further modified to take account of a perpendicular offset of width K (a signed number, the + or − sign indicating the direction of offset relative to the path segment) as follows:

$$F = \Delta X \cdot Y - \Delta Y \cdot X + (X_1 \cdot Y_2 - X_2 \cdot Y_1) + KD \quad (4)$$

for the linear case, where $D = \sqrt{(\Delta X)^2 + (\Delta Y)^2}$.

$$F = (X-X_C)^2 + (Y-Y_C)^2 - (R \pm K)^2 \quad (5)$$

for the circular case, where $K$ is added to $R$ when the arc is traced in the counterclockwise sense and is otherwise subtracted.

The cutter-width modified function of equations (4) and (5) are computed in digital computer 22, and will be denoted henceforth by F when they describe a path segment (e.g., 70) currently being traced, and by G when they denote the next successive segment (e.g., 72 to be traced.

Registers 26-40 store the following data in binary form:

| Register | Data |
|---|---|
| 26 | $\Delta X$ for currently traced path segment if linear |
| 28 | $\Delta Y$ for currently traced path segment if linear |
| 30 | value of F |
| 32 | current X position |
| 34 | current Y position |
| 36 | $X_R$ for next path segment to be traced |
| 38 | $Y_R$ for next path segment to be traced |
| 40 | value of G | where $X_R = X_2 - X_1$ and $Y_R = Y_2 - Y_1$ for a linear segment with end points $(X_1, Y_1)$, $(X_2, Y_2)$; and $X_R = X - X_C$ and $Y_R = Y - Y_C$ for a circular segment with center $(X_C, Y_C)$.

Control register 62 stores the following logical (values limited to 0 or 1) variables:

$P_M$ = current mode (0 if linear segment being traced, 1 if circular)
$R_M$ = future mode (0 if next segment linear, 1 if circular)
$W$ = sense in which current circle traced (0 if clockwise, 1 if counterclockwise)
$S_X$ = sign of current $X$ position
$S_Y$ = sign of current $Y$ position
$S\Delta X$ = sign of current $\Delta X$ if current linear mode
$S\Delta Y$ = sign of current $\Delta Y$ if current linear mode
$S_F$ = sign of F
$S_G$ = sign of G
where the sign of any variable is 0 if the variable is greater than or equal to zero, and otherwise is 1.

Logic 60 includes circuitry for computing the following logical (values limited to 0 or 1) control functions (the symbol $\oplus$ representing exclusive OR)

If $P_M = 0$
$L_{XY} = \overline{(S\Delta X \oplus S\Delta Y \oplus S_F)}$
$L_A = (S\Delta X \cdot S_F) + (S\Delta Y \cdot \bar{S}_F)$
$G_{XY} = L_{XY}$
$G_A = L_A$ If $P_M = 1$
$C_{XY} = W \oplus S_X \oplus S_Y \oplus \bar{S}_F$
$C_A = W \cdot [(\bar{S}_Y \cdot \bar{S}_F) + (S_X \cdot S_F)] + \bar{W} \cdot [(S_Y \cdot S_F) + (\bar{S}_X \cdot \bar{S}_F)]$
$G_{XY} = C_{XY}$
$G_A = C_A$ In general, the system operates by pulsing servos 24, 25 so as to maintain F (cutter width modified as in equations (4) and (5)) as close as possible to zero during movement along the current path segment, updating the functions (F, G) and variable (X, Y, $X_R$, $Y_R$) registers (30, 40, 32, 34, 36, 38) after each stepwise movement of the drive, and, when the value of G changes sign, transferring the G function to the role of the newly current F function to control movement along the next path segment.

Initial computation of functions F and G, based upon the raw path and cutter data, takes place in computer 22. Subsequent updating of the functions occurs in unit 20. In the description that follows the origin of the X-Y coordinate system is taken as the center of the currently traced path segment when circular, and otherwise is arbitrary.

Servos 24, 25 are pulsed according to the following table:

| $G_{XY}$ | $G_A$ | Unit Pulse Emitted |
|---|---|---|
| 0 | 0 | +X |
| 0 | 1 | −X |
| 1 | 0 | +Y |
| 1 | 1 | −Y |

After the pulsing, the F, X, and Y registers (30, 32, 34) are updated. Advantageously, F (as well as G) can be updated wholly within unit 20 by applying simple rules relating the changes in the function's value to the changes in X and Y. Thus, the updating of registers 30, 32, 34 proceeds according to the following table when $P_M = 0$ (i.e., the current path is linear, so that F is given by equation (4)):

| $L_{XY}$ | $L_A$ | Effect on Register 30 (F) | Effect on Register 32 (Y) | Effect on Register 34 (Y) |
|---|---|---|---|---|
| 0 | 0 | $-\Delta Y$ | +1 | |
| 0 | 1 | $+\Delta Y$ | −1 | |
| 1 | 0 | $+\Delta X$ | | +1 |
| 1 | 1 | $-\Delta X$ | | −1 |

Similarly, for $P_M = 1$ (i.e., the current path is circular, so that F is given by equation (5)):

| $C_{XY}$ | $C_A$ | Effect on Register 30 (F) | Effect on Register 32 (X) | Effect on Register 34 (Y) |
|---|---|---|---|---|
| 0 | 0 | +2X+1 | +1 | |
| 0 | 1 | −2X+1 | −1 | |
| 1 | 0 | +2Y+1 | | +1 |
| 1 | 1 | −2Y+1 | | −1 |

After updating of registers 30, 32, 34, the G, $X_R$, and $Y_R$ registers (40, 36, 38) are updated as follows:

When $R_M = 0$ (i.e., the path segment being approached is linear, so that G is of the form given by equation (4)):

| $G_{XY}$ | $G_A$ | Effect on Register 40 (G) |
|---|---|---|
| 0 | 0 | $-Y_R$ |
| 0 | 1 | $+Y_R$ |
| 1 | 0 | $+X_R$ |
| 1 | 1 | $-X_R$ |

When $R_M = 1$ (i.e., the path segment being approached is circular, so that G is of the form given by equation (5)):

| $G_{XY}$ | $G_A$ | Effect on Register 40 (G) | Effect on Register 36 ($X_R$) | Effect on Register 38 ($X_R$) |
|---|---|---|---|---|
| 0 | 0 | $+2X_R+1$ | +1 | |
| 0 | 1 | $-2X_R+1$ | −1 | |
| 1 | 0 | $+2Y_R+1$ | | +1 |
| 1 | 1 | $-2Y_R+1$ | | −1 |

When $S_G$ changes, movement stops along the then current path segment, and an interrupt signal is sent to computer 22, causing the computer to compute a new G function and distribute its initial value to register 40, and to compute and distribute new initial values of $X_R$ and $Y_R$ to registers 36 and 38. The current value of the previous G function is transferred from register 40 to register 30. (Alternatively, with slight loss of accuracy, register 30 can simply be reset to zero instead of transferring the value from register 40.) Register 62 is updated, and movement along the new path segment commences.

Unit 20, in detail, consists of conventional circuitry to carry out the operations described above, e.g., working registers for storing partial results, double width registers for functions F and G, routing logic, cycling clocks, and the like.

Figure 23:
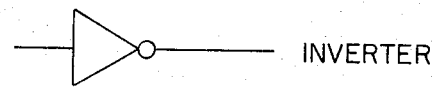
FIG. 23 is a chart identifying symbols used in FIGS. 4–21.
Figure 23:
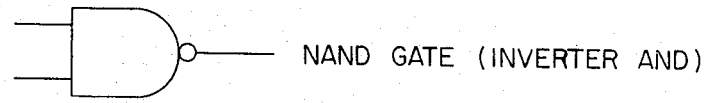
Figure 23:
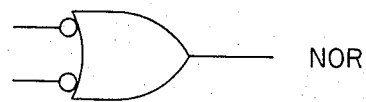
Figure 23:
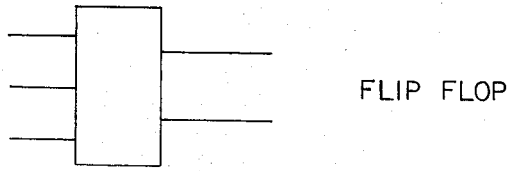
Figure 23:
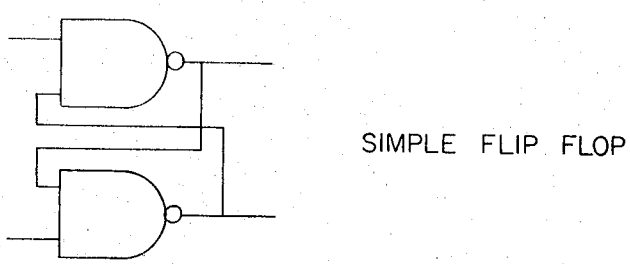

The detailed circuitry is shown, using conventional symbols, in FIGS. 4–21. FIG. 23 is a chart identifying symbols used, to avoid any confusion. Interconnections between the blocks of elements shown in FIGS. 4–21 are indicated by reference numerals 300 and above which, in effect, define an interconnecting wiring list.

As shown in detail, the system operates in mutually exclusive load and run modes. The load mode includes a read operation during which current position values are read as computer binary data words by computer 22 and may be used to compute the next intersection point, and a write operation during which the data describing current position and the next intersection point are sent as computer binary data words to the interpolator along with a command word describing the curve or line to be followed. Fixed sequences of data words are provided for accomplishing data transfer during read and write operations. During the run mode the calculations necessary to follow the commanded line or curve are made.

Figure 5:
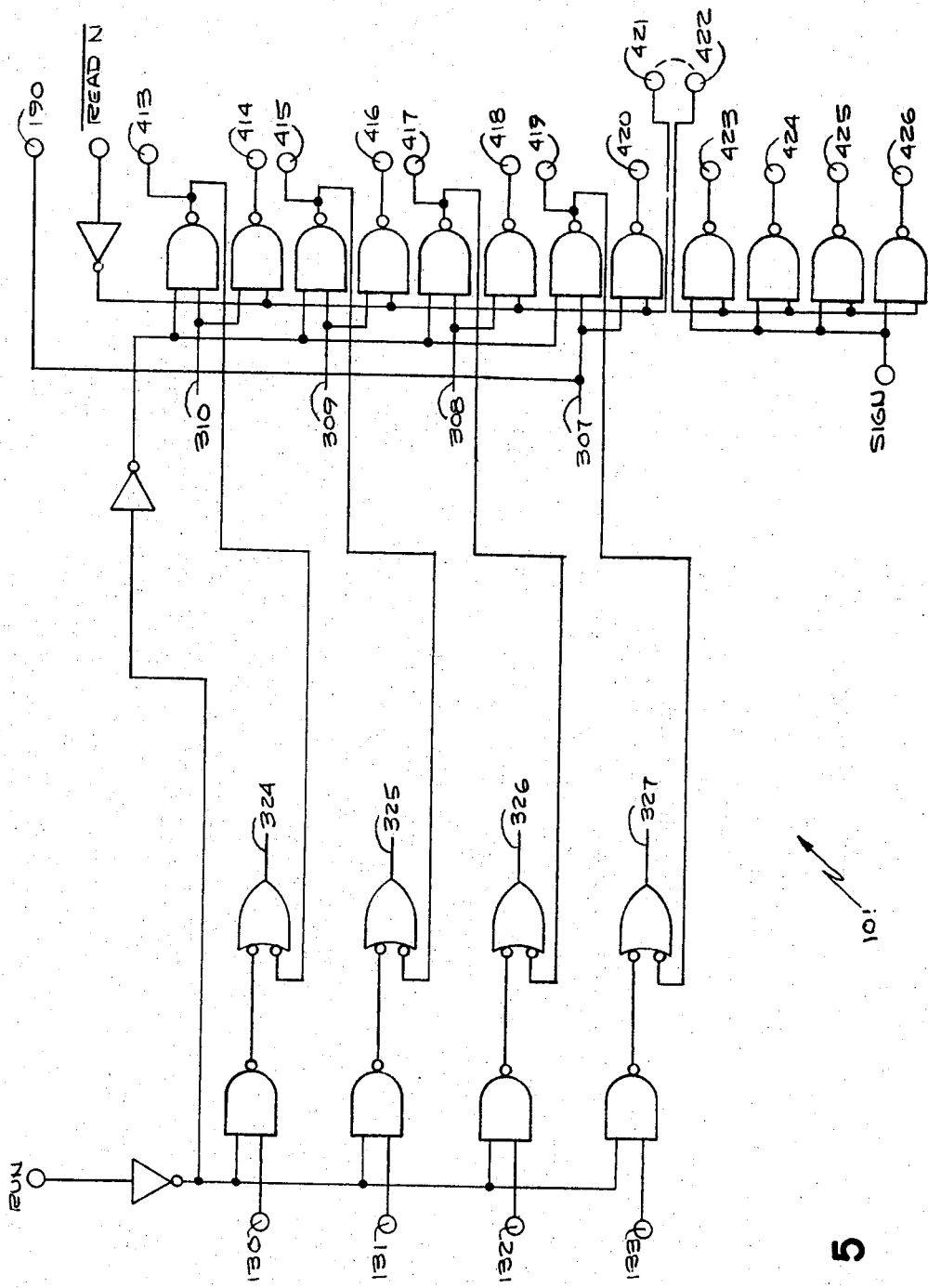
Figure 6:
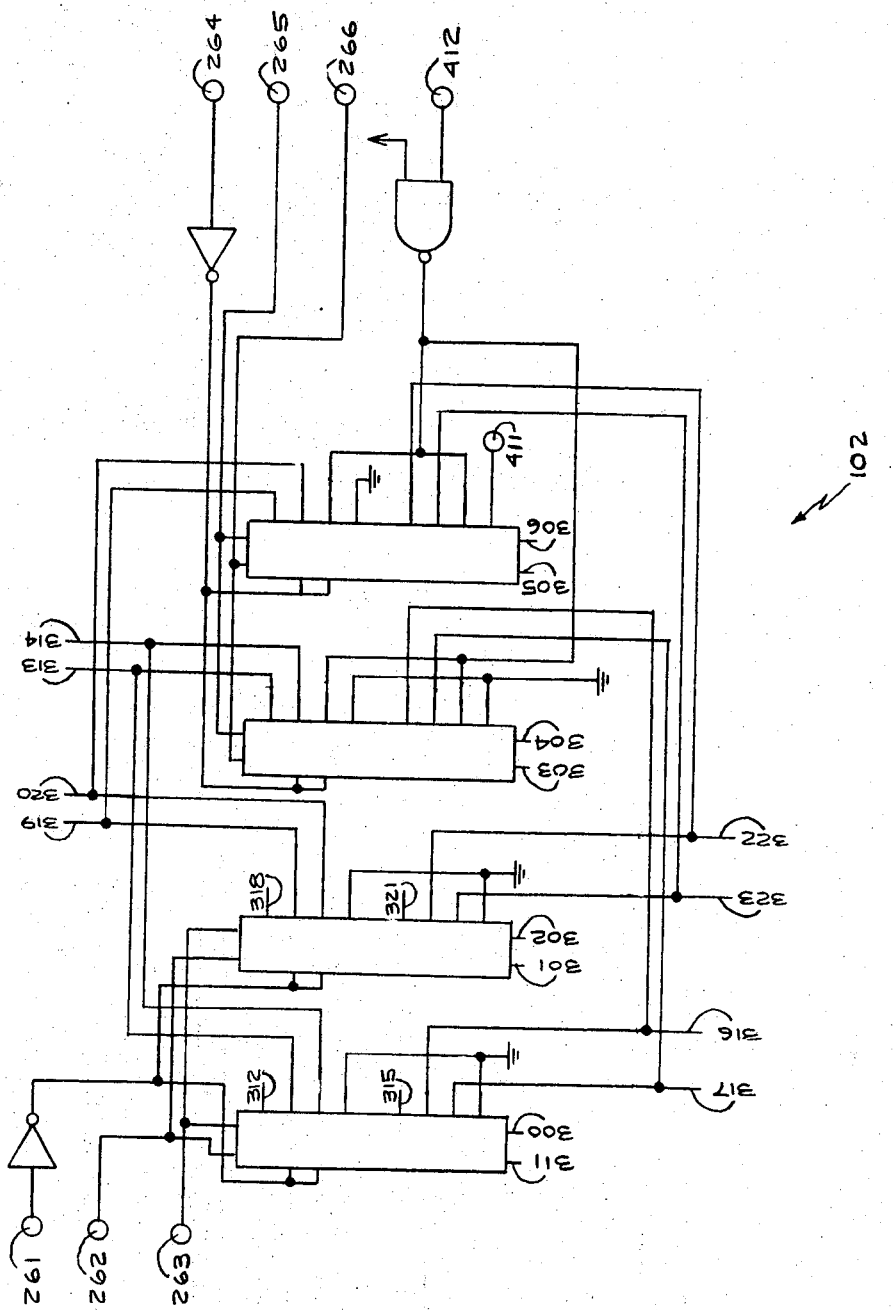
Figure 7:
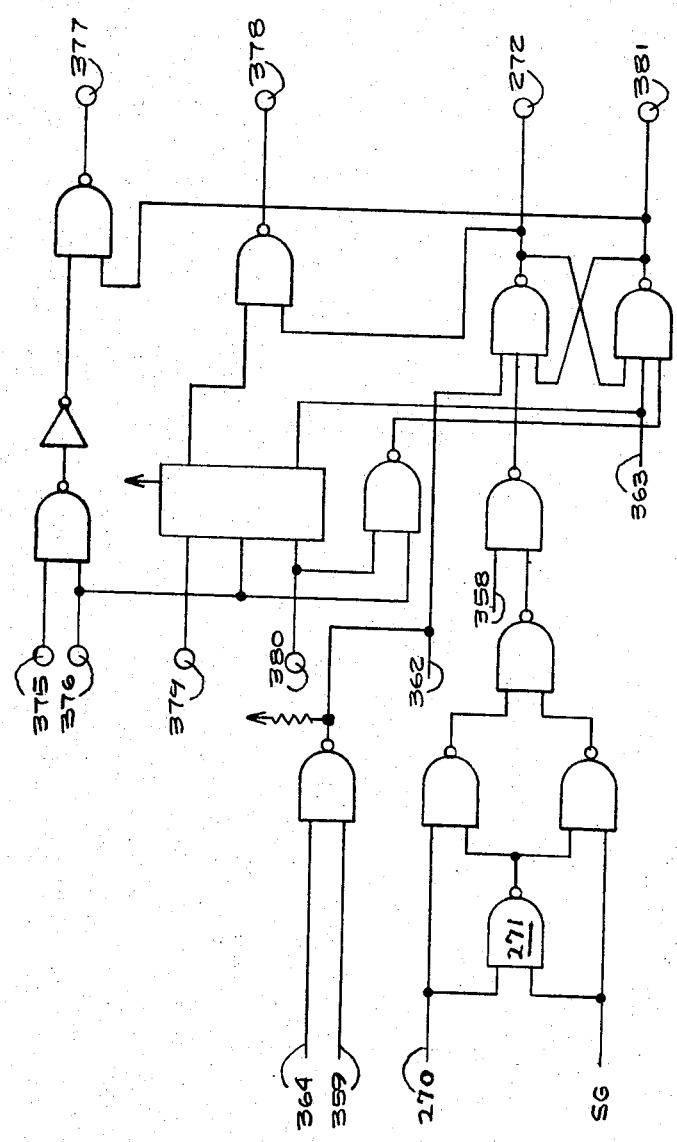
Figure 8:
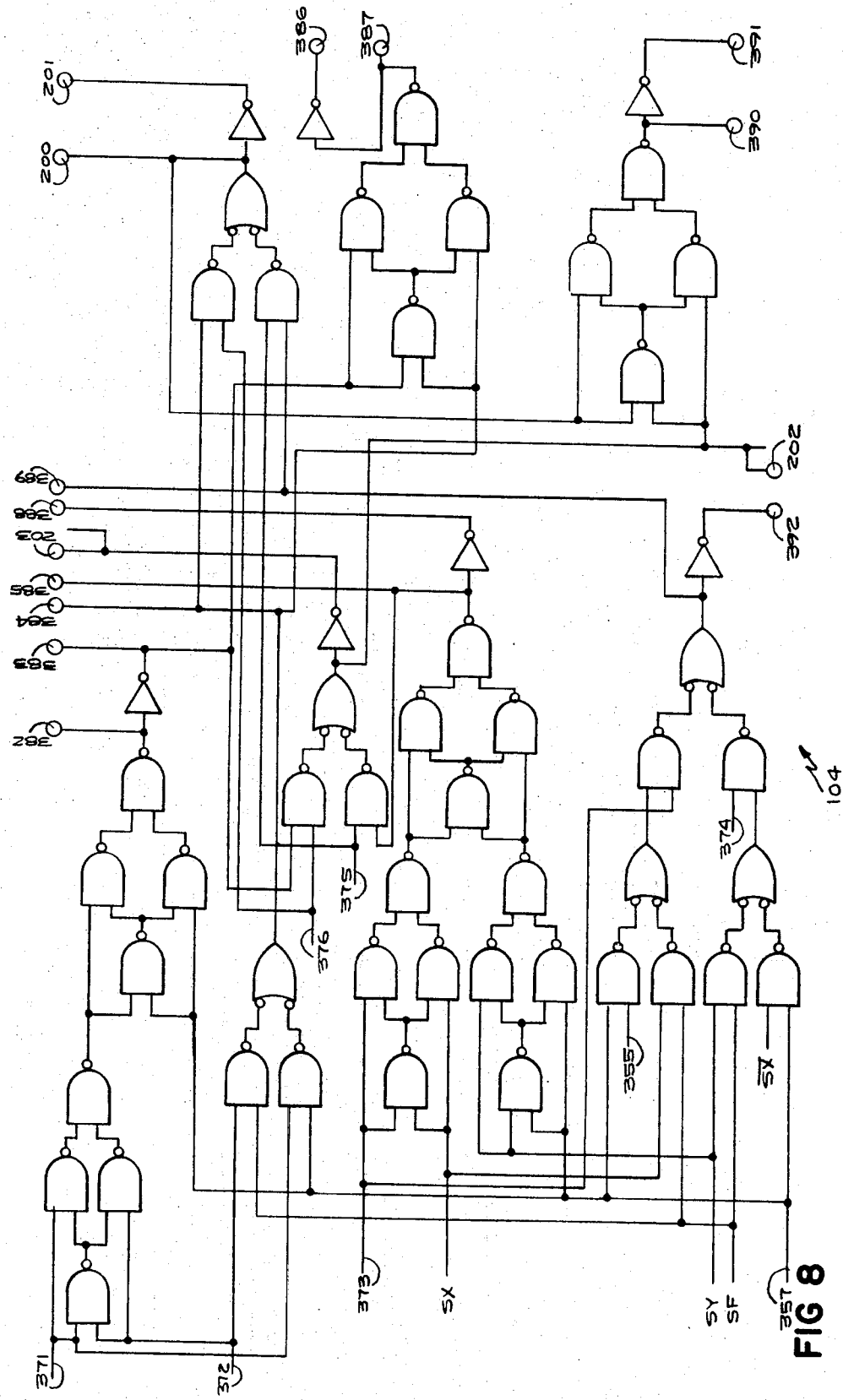
Figure 9:
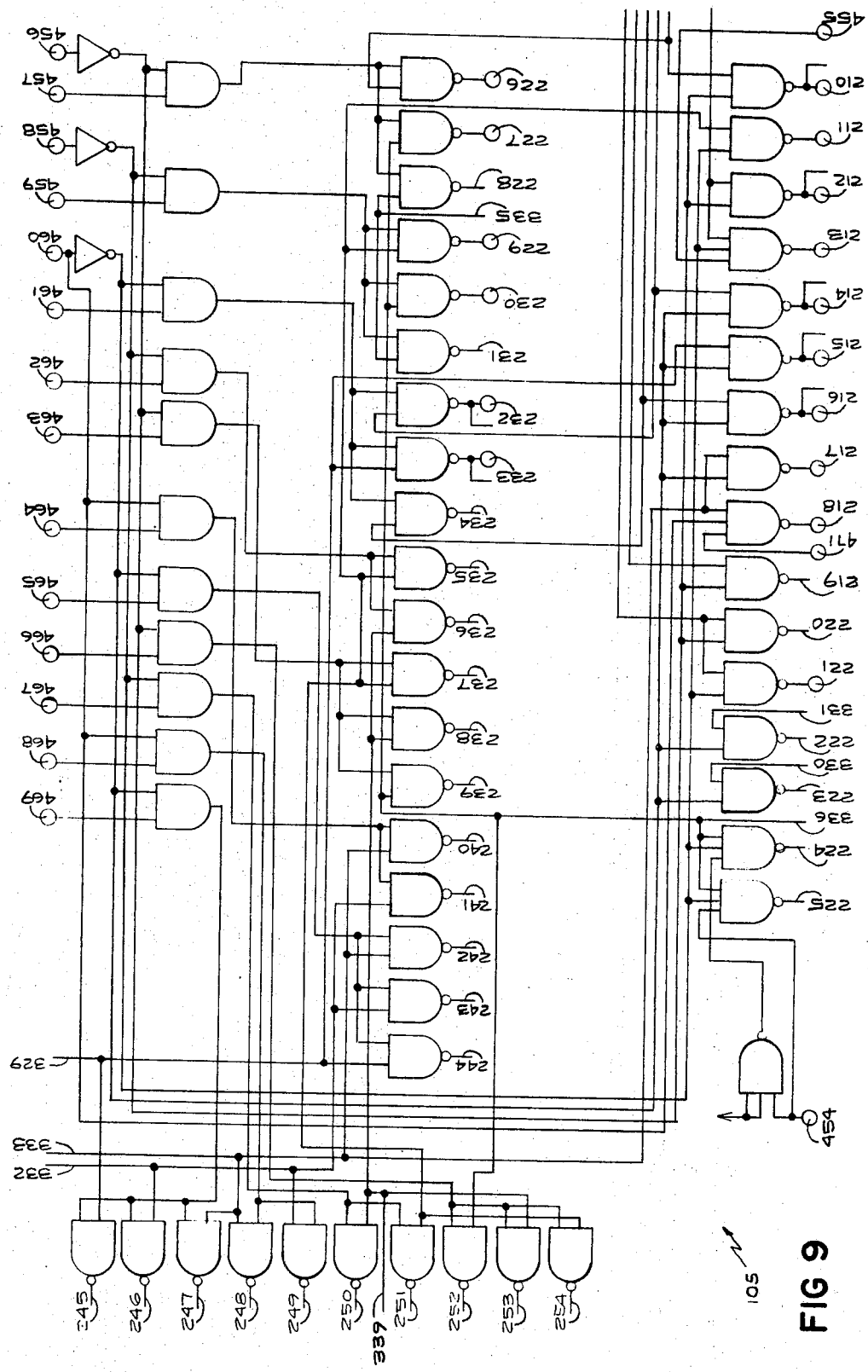
Figure 10:
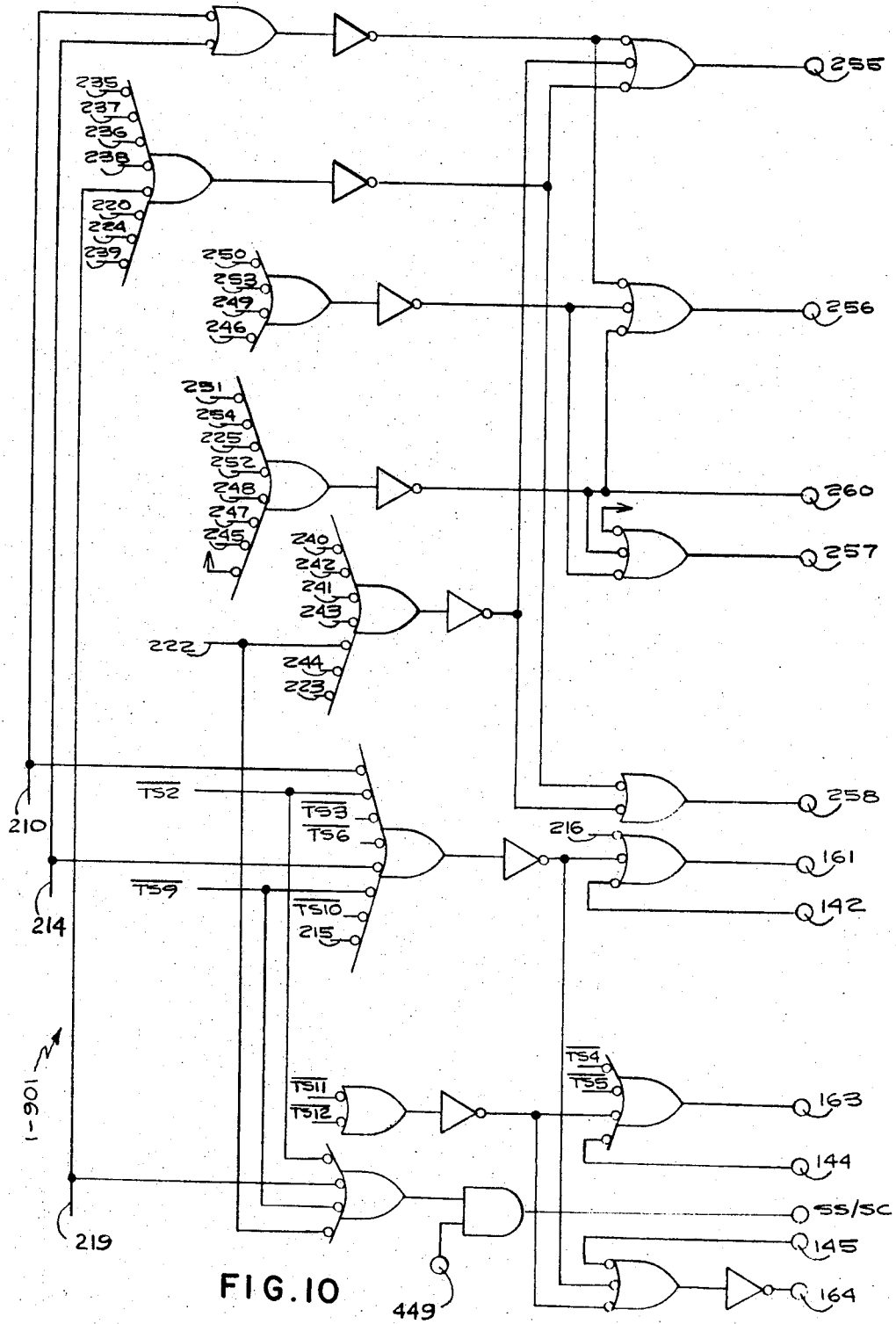
Figure 11:
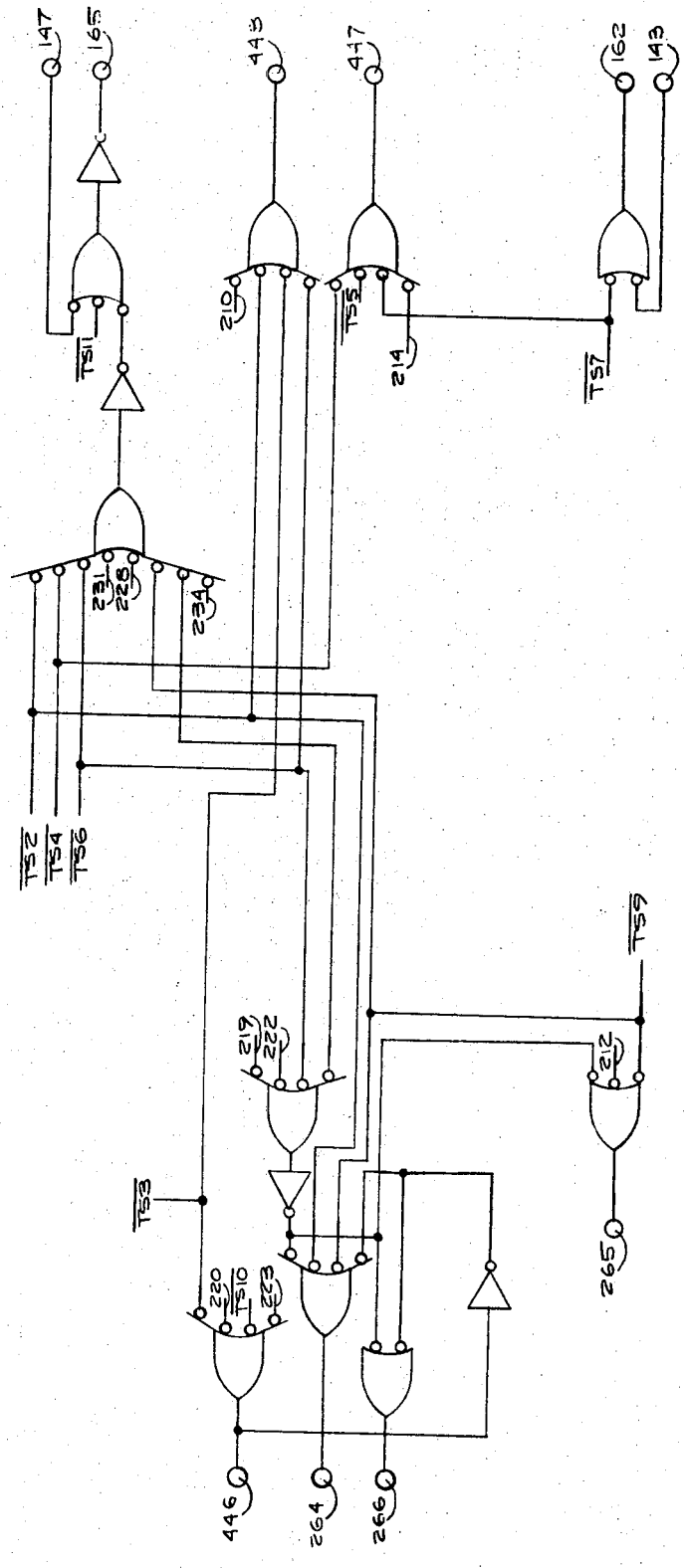
Figure 12:
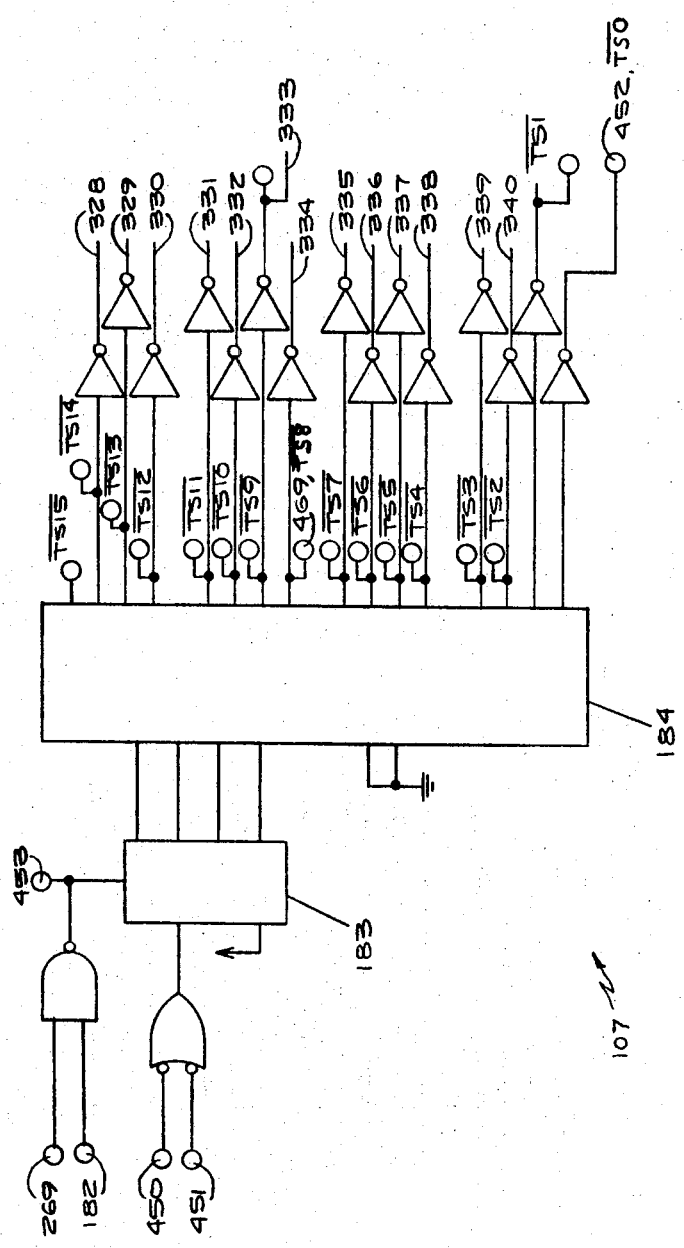
Figure 13:
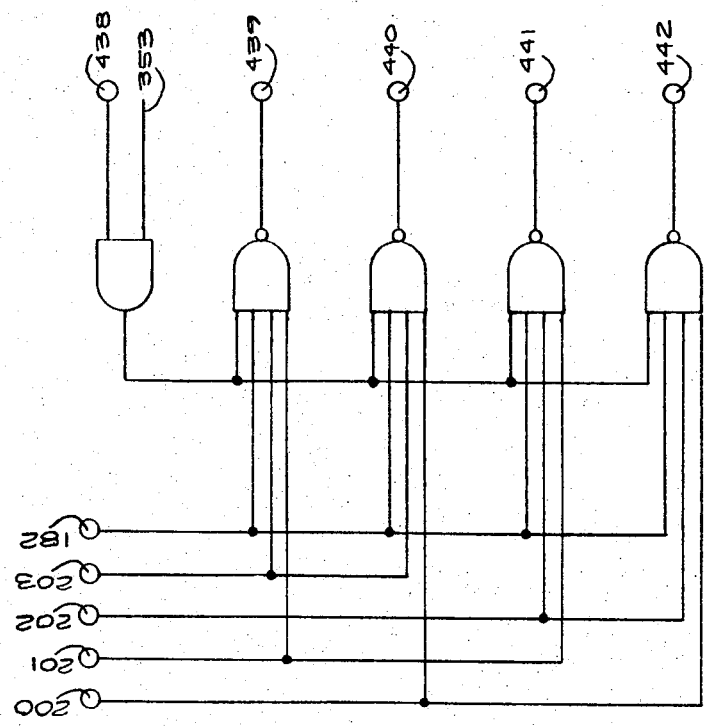
Figure 14:
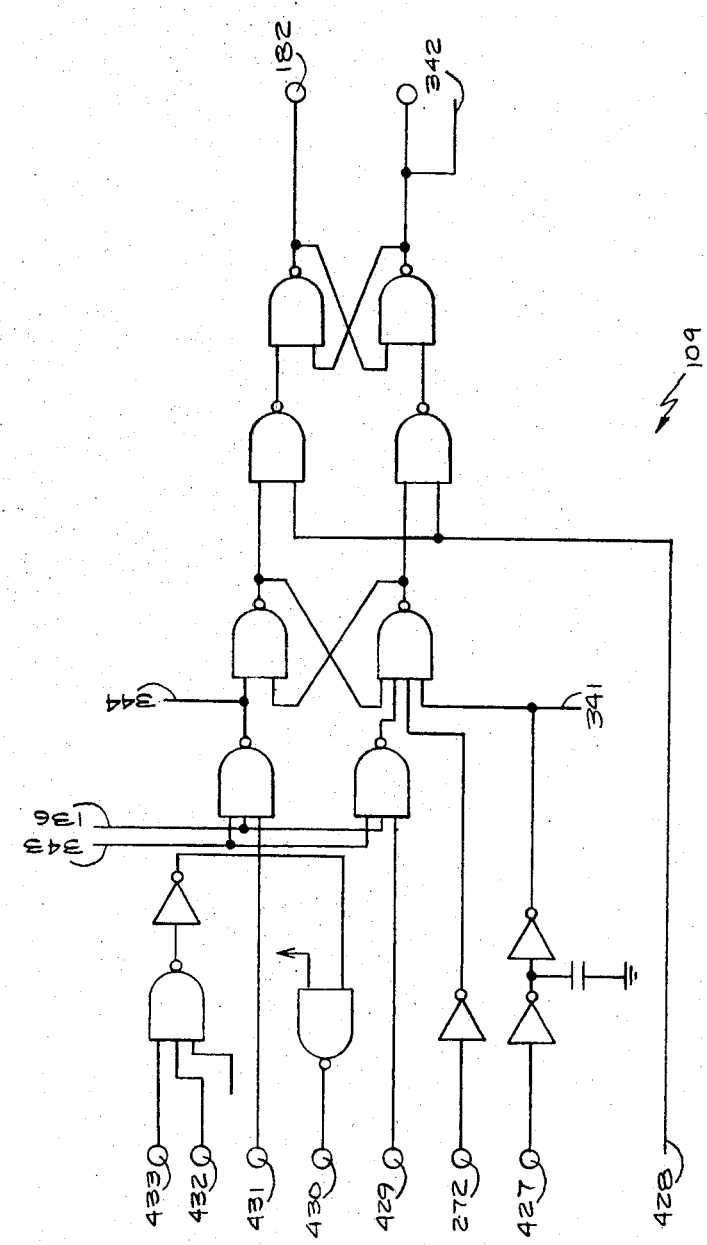
Figure 15:
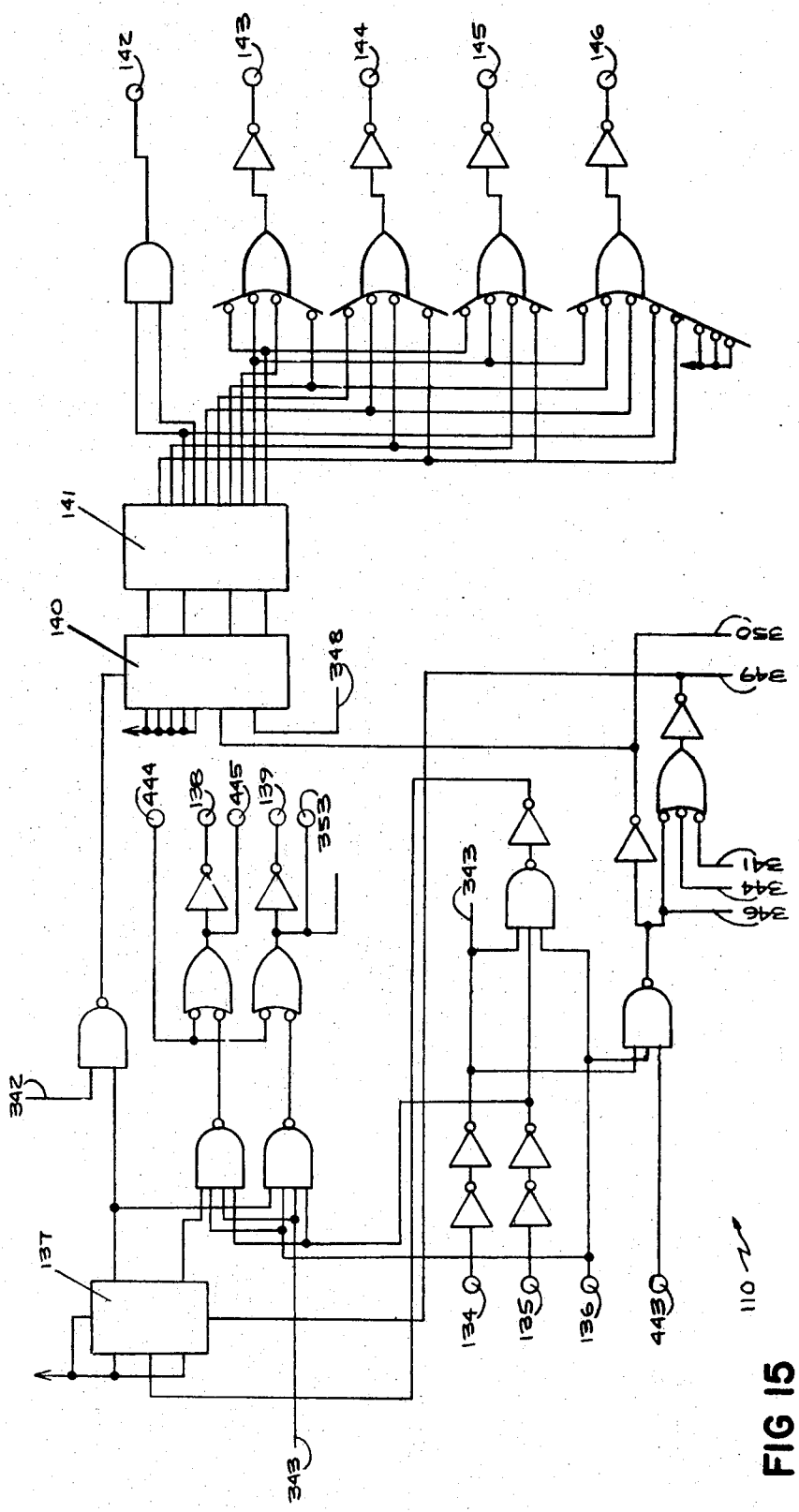

The sequence of variables used is the same during both the read and write states. With one implementation, using a computer with 12 bit words, the variables come in the following order: $\Delta X$, $\Delta Y$, X, Y, F high, F low, $X_R$, $Y_R$, G high and G low, registers 30 and 40 (FIG. 4) being of double (24 bit) width to accommodate the high and low order components of F and G, respectively. With the 12-bit computer the 20-bit variables must be broken into two parts—a high and a low order. The high order is sent to the interpolator first followed immediately by the low order. Therefore, the ten variables and the two pieces of each variable constitute a 20-bit transfer from the computer. The input lines of data coming from the computer appear to each section of the interpolator as data lines 130 through 133 inclusive (FIG. 5). The selection cycle from the computer appears in block 110 (FIG. 15) as a selection pulse on line 134; a write instruction on line 135; followed by a load strobe on line 136. The coincidence of these three pulses on lines 134 through 136 complements or toggles a flip-flop 137 in block 110 which determines the A and B parts of the data word. The A part is the high order eight bits of the word. The most significant four bits of this word are disregarded on a write. The B part is the low order part of the word.

Flip-flop 137 determines the A and B phasing of the data word. The complementary states of this flip-flop determine in turn a write strobe on lines 138 or 139, that accomplishes the loading into the registers (scratch pad memories) 26–40, in block 100. The toggling of the flip-flop 137 is counted by a four-bit counter 140. For each two write cycles from the computer, counter 140 changes one count. The state of 140 is decoded by a binary coded decimal to decimal decoder 141, thus enabling generation from the 10 outputs of the decoder the correct write lines 142 to 146, inclusive. These signals on lines 142–146 are generated to meet the addressing requirements of block 100.

Figure 16:
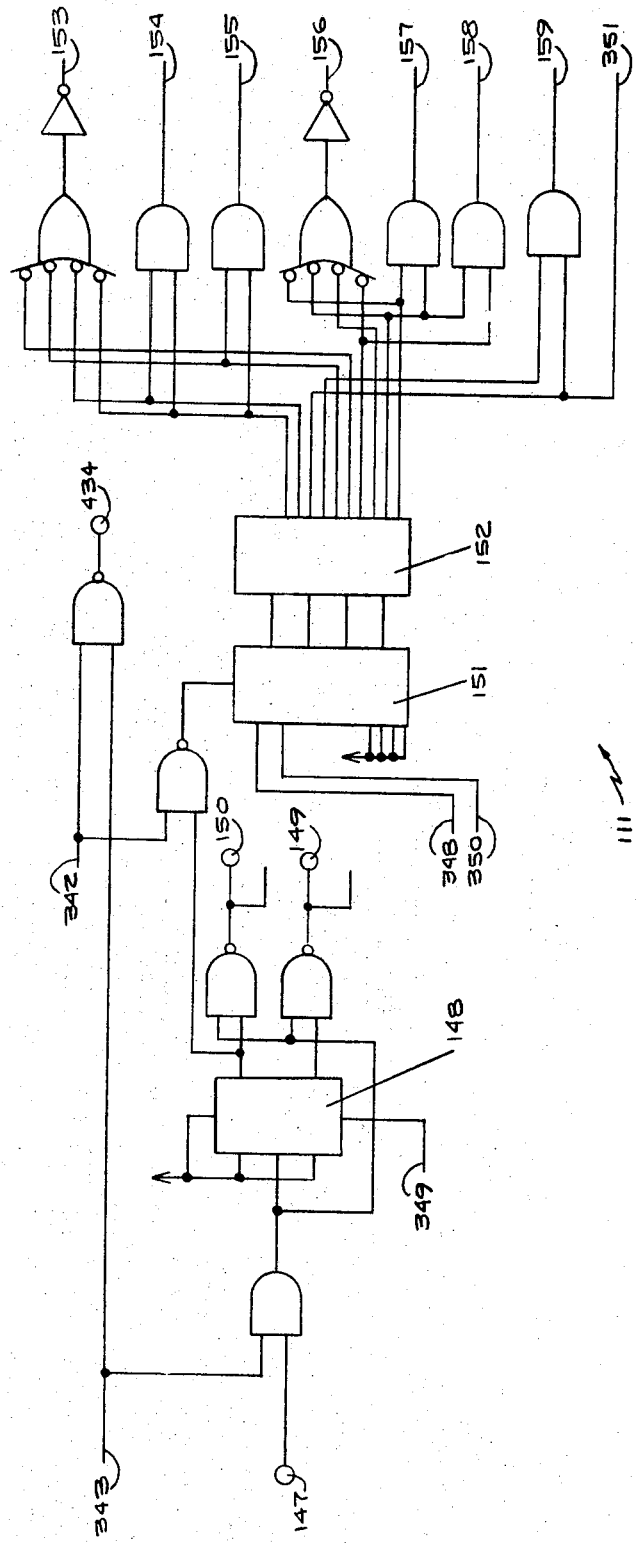
Figure 17:
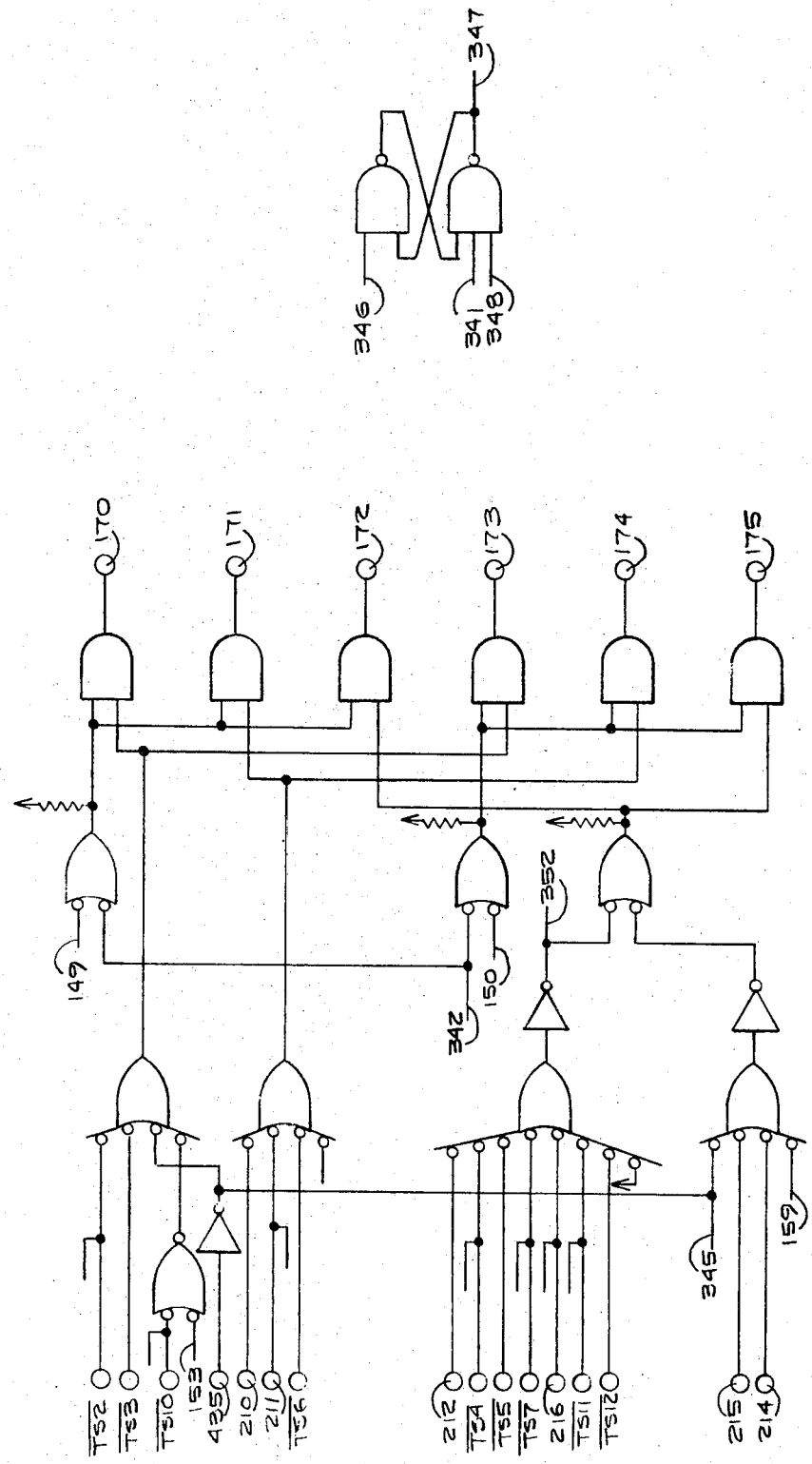
Figure 18:
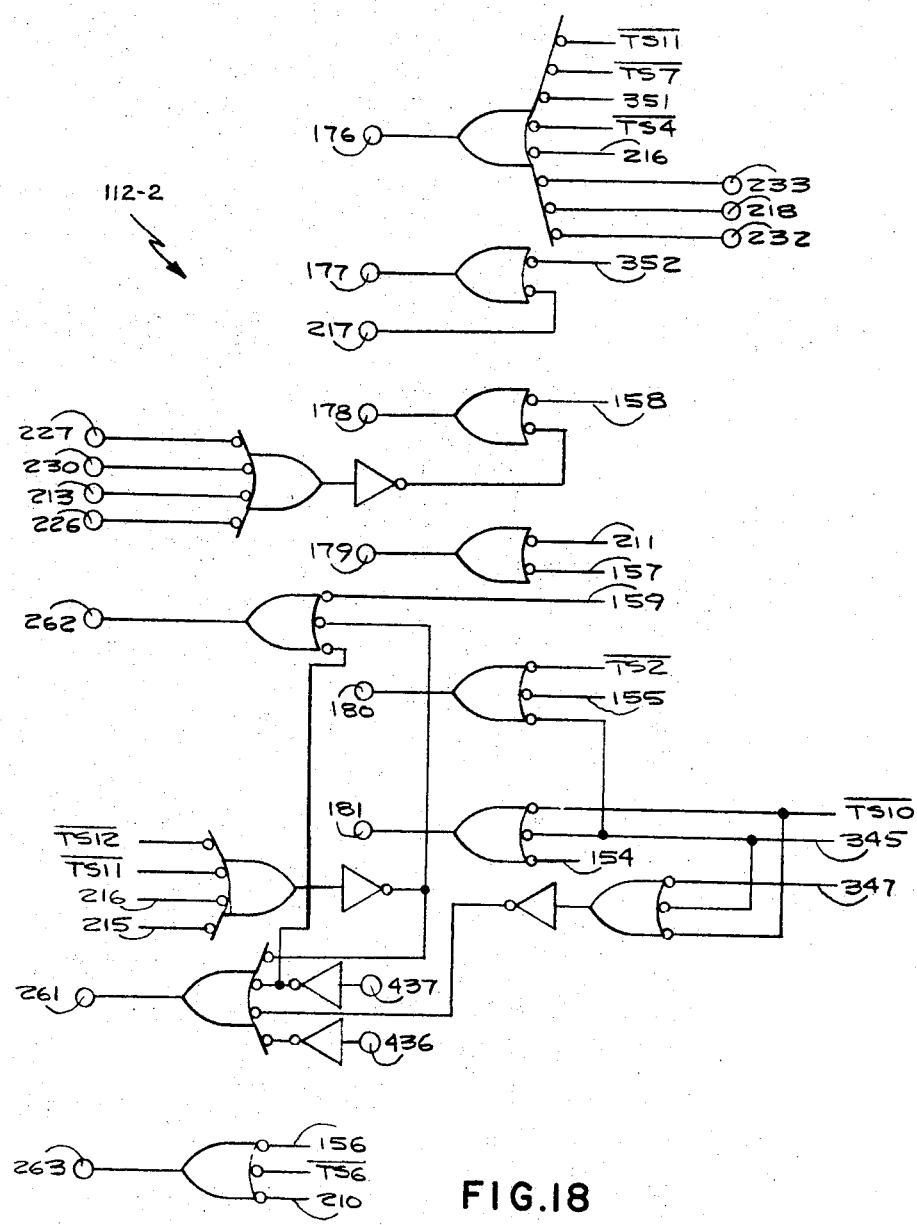
Figure 19:
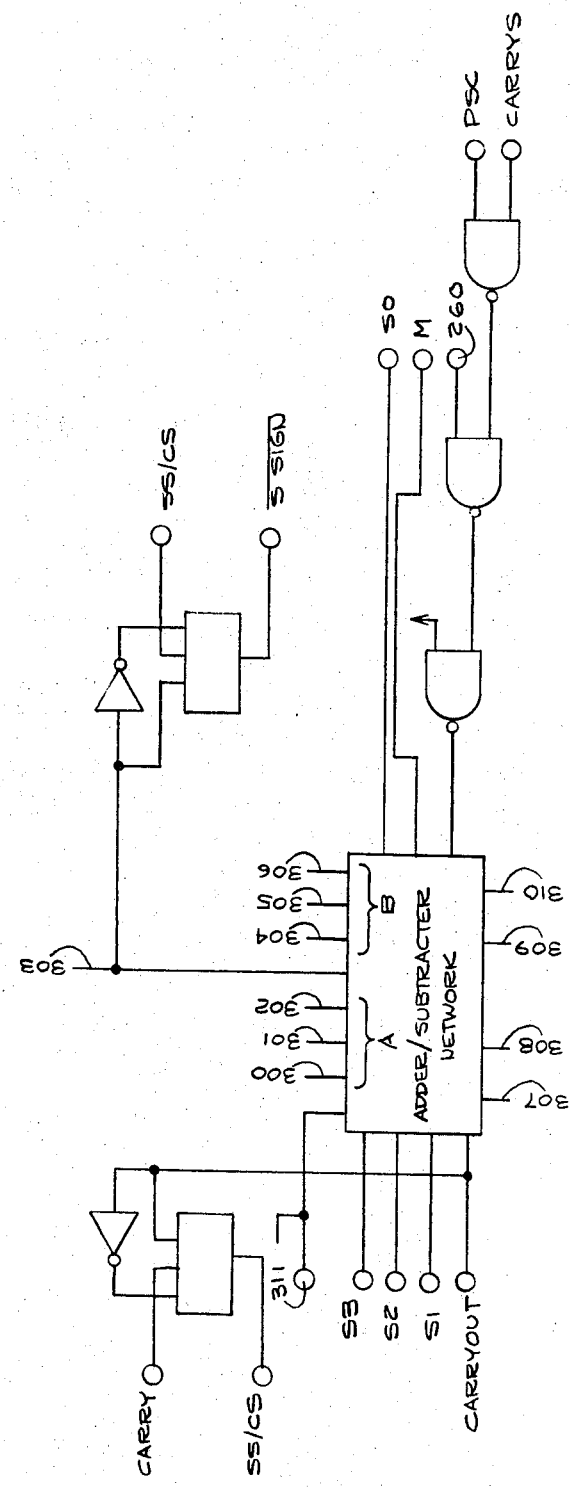

The other mode of operation covered during a load cycle is the reading of the variables from scratch pad memories 26–40 in block 100. The reading is accomplished in the same order as the write. The mechanism for accomplishing this is much the same. The primary difference is the read instruction on line 147 (FIG. 16), which, combined in a logical "AND" operation with the selection pulse on line 134 from block 110 (FIG. 15), is used to complement flip-flop 148 (FIG. 16). This flip-flop determines the A and B phasing of the read so that the high and low orders of the variable are put in the right sequence. Thus, flip-flop 148 generates a read A pulse on line 149 followed by a read B pulse on line 150. The toggling of 148 is counted by a four-bit counter 151 in block 111 (FIG. 16) which is decoded by a BCD to decimal decoder 152. This enables the proper read address signals for a load to be generated for the read address lines 153 through 159, in order that the variables may be read from the scratch pad memories and loaded in the computer. The write signals on lines 142 through 145 go to block 106 (FIGS. 10, 11) where they are combined in a logical "OR" operation with the signals generated during the computation cycles (to be discussed below), generating signals on lines 161 through 163. These signals are used to select the write addresses for the registers. The data is placed on lines 130 through 133.

Block 100 corresponds, as shown here, to a four-bit segment of a 20-bit word. Five such segments are stacked to generate the 20-bit word. Visualizing them as a five-story building, the top two stories are loaded by the addressing signals on lines 161 through 163 and the signal on line 138, which is the first of the two write strobes generated in block 110. The bottom three stories or the second half of the variable, is loaded by the second write strobe on line 139, thus accomplishing a 20-bit write from a 12-bit computer. Register control signals are on lines 164 and 165.

The same type of control relationship exists in the signals on lines 153 through 159, in which these lines generate the read addresses to block 100. The read addresses operate in essentially the same way on lines 170 through 181. The first read signal, a Read A pulse on line 149, selects the upper two stories of the five-story building, and a read B signal on line 150 selects the bottom three stories and presents them to the computer. The high order part of the data words is selected by the signals on lines 170, 171 and 172, and the low order part of the data word is selected by signals on lines 173, 174, and 175, so that during the read cycle the correct addressing of the data variables is accomplished as a two-step function, thus giving a twenty selection read cycle from the computer, to accomplish a 10-data word transfer. This completes the first portion of the cycle. The write portion controlled by clock 110 occurs prior to the execution of a run cycle and the read normally occurs subsequent to the arriving at an intersect and just prior to another write during which the data for the next path is given to the interpolator. Other common data transfer methods can be used for reading out and loading in data to the registers. The method shown is by way of illustration.

Figure 20:
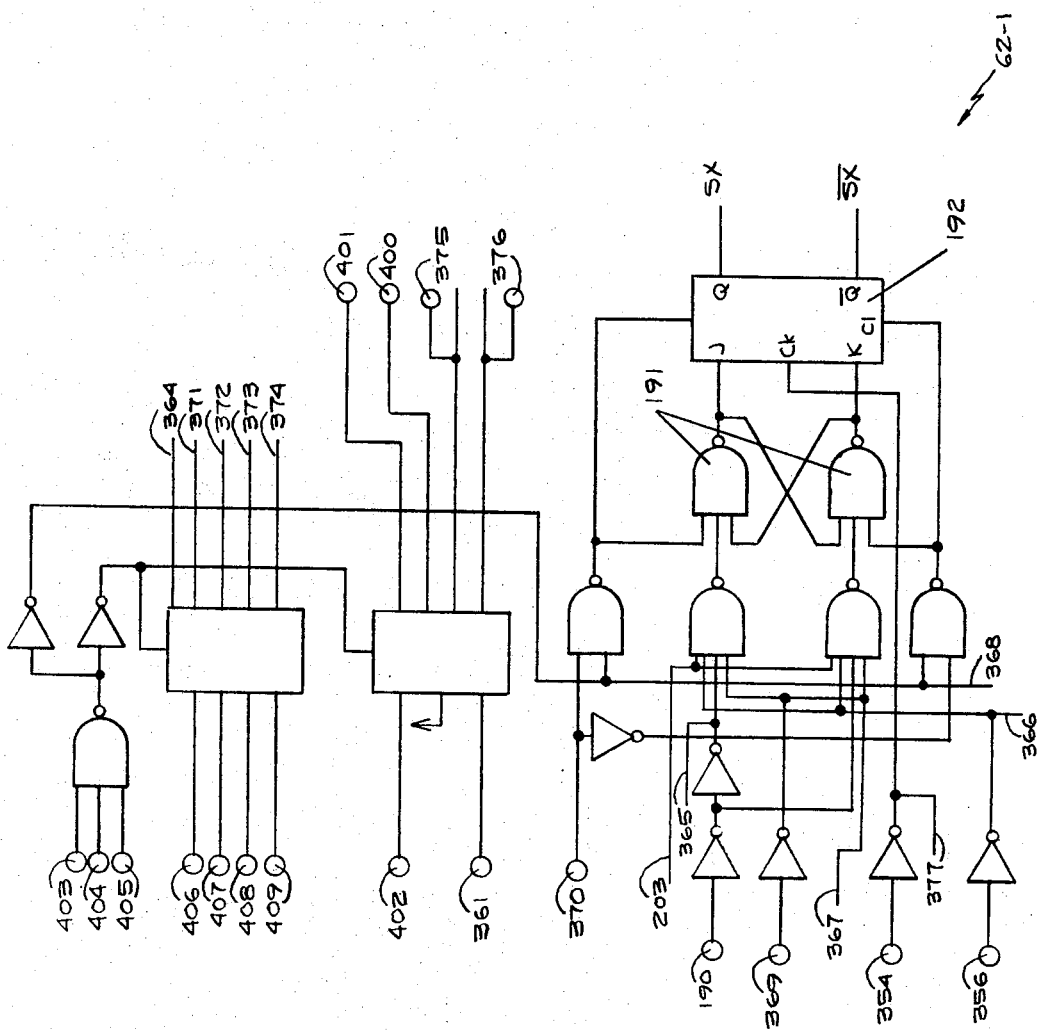
Figure 21:
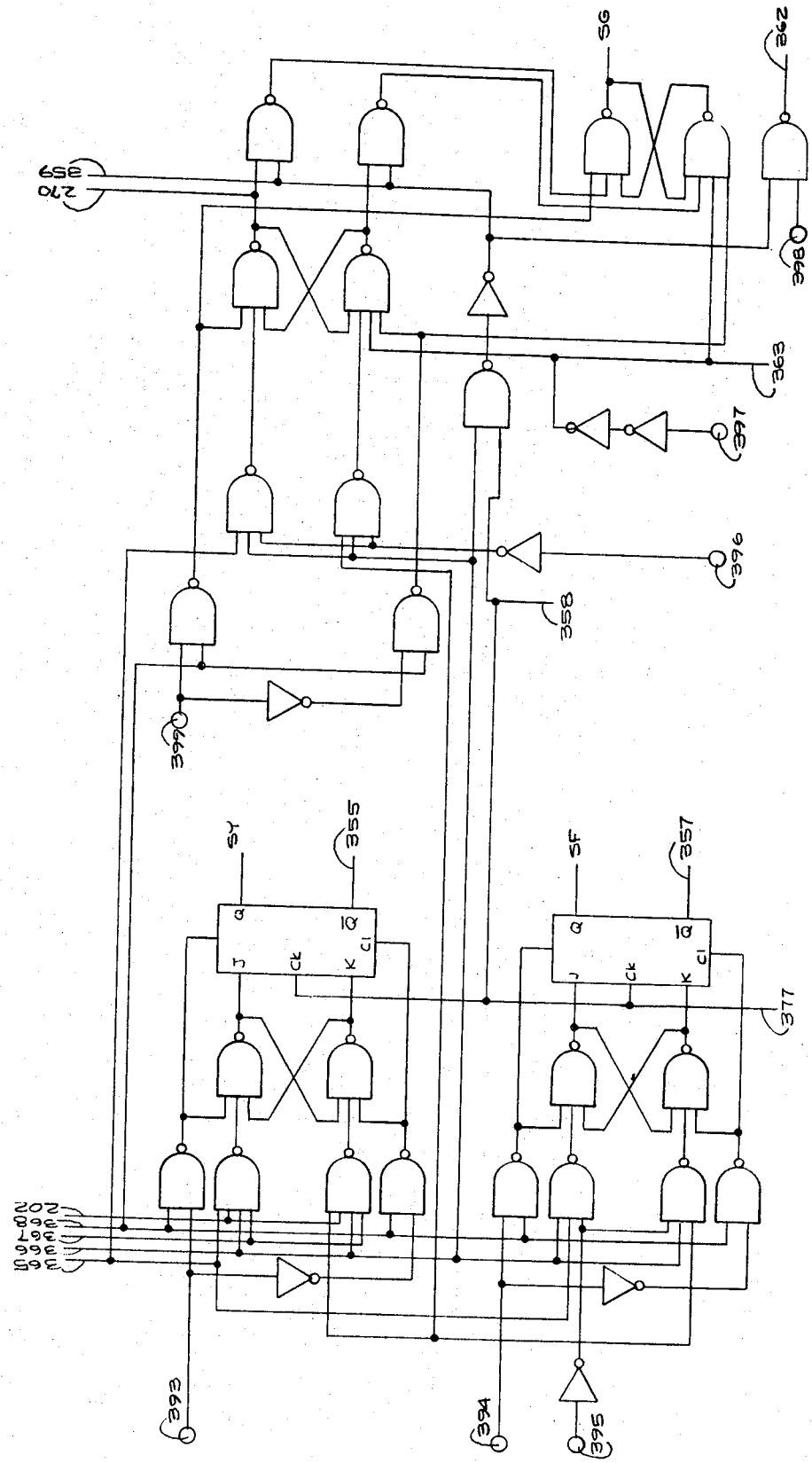

Proceeding now into the other portion of the logic, assume that a write cycle has just occurred. A selection pulse is sent to the interpolator, as previously explained. A run mode is generated on line 182 in block 109 (FIG. 14), which turns on block 107 (FIG. 12) which is a time-state generator, generating 16 time states, by decoding a four-bit counter 183 with a binary decoder 184. The time states, designated TS0 through TS 15 inclusive, are used to accomplish the calculations necessary to follow the designated path, be it a line or a circle. Prior to the starting of the calculations, a data word must be loaded in block 62 (FIGS. 20–1) containing the initial values of the logical variables stored there. These are in turn updated as the calculations proceed. In the case, for example, of the sign of X, the data is picked off from the interpolator on line 190 of block 101 (FIG. 5). A computation is done on the sign of X during time state TS 7 and the variable sign is thereupon stored in a latch 191 (FIG. 20) and at the end of the cycle during the time state TS 15 the data stored in 191 is updated into a flip-flop 192; had the sign of X changed during the computation, the sign latch would be updated in time for the next computation cycle. A cycle is defined as TS0 through 15, inclusive, one complete calculation. When the signal on line 182 indicates that the interpolator has been started, during the time state TS0 the X or Y step pulse to the drive is generated by block 108 (FIG. 13) and sent to servo 24 or 25. The remainder of the time states TS1–15 are then used to calculate where the servo should go. The step is made depending on the condition of signals on lines 200 through 203 inclusive in block 104 (FIG. 8) which determines whether an X or Y pulse is sent to the servos 24, 25 and also whether it is a positive or negative step. A calculation cycle then occurs which is dependent upon Pm for the first half and Rm for the second half. During the remainder of the time cycle, computation is under the control of block 104. The logical variables in block 104 are used to generate signals $L_{XY}$, $L_A$, $C_{XY}$, and $C_A$, $G_{XY}$ and $G_A$, which do not change during one time cycle of the system. These logical functions are logically fitted together in block 105 (FIG. 9) with the time-state generator, block 107, to generate signals on lines 210 through 254. These latter signals are time sliced with the cycle generator to generate in block 106 the correct signals for the interpolator so that the data computed in the proper way, depending upon the path being followed and the path to be followed. Block 106 performs the "OR" function on the write signals generated by block 110, signals in lines 142 through 146 inclusive, derived to control the writing of the data into the appropriate places in the registers in block 100. The signals on lines 210 through 254 are used as shown to determine the appropriate states of 161 through 165 inclusive, during the run cycle. Also they are used to determine signals 255 through 258 and to control the routing given by signals 261 through 266. This handles the routing of the appropriate variable on either the A or B inputs of the adder/subtracter 44, FIG. 19. Once started, the interpolator will proceed as controlled by its input 269. Block 107 (FIG. 12) is continually generating time states until such time that the G function as initially loaded from the computer changes sign. The sign change is detected in block 103 (FIG. 7) from the control logic in block 62 (FIGS. 20, 21). When the sign change is detected an interrupt is generated to the computer indicating that an intersect has been reached. The detection of the sign changing is done by looking at $S_G$, which is the value of the sign of G from the previous state, and looking at signal 270, which is the just recently updated sign of G, and should the exclusive OR 271 detect that these two signs are different, it causes an interrupt to be generated during the time state 15 which will tell the computer that the sign of G has changed, i.e., an intersect has been reached, and will also cause the start latch in block 109 (FIG. 14) to be reset by signal 272. The interrupting causes the computer by means of its program to initiate a read cycle to determine that it is at the correct intersect. It is possible in a case of a line and circle or two circles to have a double intersect, one of which is not the correct intersect. In this case, the interpolator would simply be restarted and would continue along the program path until it reached the second intersect point.

Figure 22:
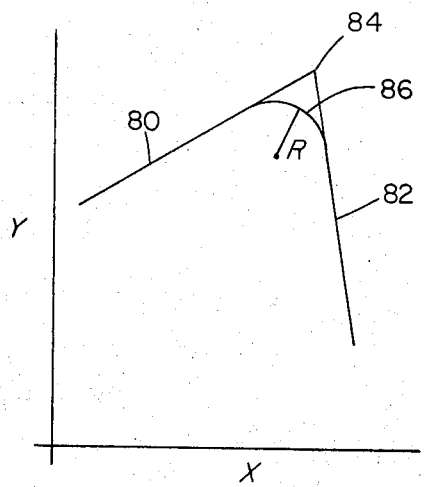
FIG. 22 is a diagram showing two lines and an inscribed arc to be traced in an X–Y coordinate system.

FIG. 22 illustrates an additional feature of the invention, useful where the tool is to trace successive intersecting paths 80 and 82 (these paths, here shown as linear, being the actual lines followed, cutter compensation (if any) already having been taken into account). Instead of following path 80 all the way to vertex 84, it is frequently desired to cause the tool to trace an inscribed curve, here a circular arc 86 of radius R, mutually tangent to lines 80 and 82. This can be accomplished by modifying K in Equation (4) to include the desired radius R (so that K as modified, represents a pseudo offset equal to the sum of the actual desired offset, if any, and the desired R), and to use in registers 32 and 34 pseudo values for X and Y, which correspond to a pseudo path offset from the actual tool path by R. Thus, movement along path 80 will stop when the pseudo position in registers 32 and 34 is at the center of arc 86, with the actual tool position being at the point of desired tangency of the arc and line 80. The tool is then caused to follow arc 86, in the manner described earlier. This procedure is particularly advantageous to a programmer in preparing the program to manufacture or draw a given part with such inscribed curves (e.g., to provide fillets or round corners, whether or not tool offset is required). The programmer need not calculate the intersection of the inscribed curve with the two paths. His program need consist only of a description of the two paths and the curve to be inscribed, in conventional nomenclature, e.g., as a numerical control tape directly useable in the system described.

As is apparent, the invention can be embodied fully in software, by programming a general purpose computer to function as computational unit 20. While those skilled in the programming art will be able to devise suitable programming for realization of unit 20, an example is provided here for completeness. The following program was written for execution on the Honeywell H112 Digital Controller, and employs codes described in the Programmers Reference Manual (Document No. 70130072242B, Apr., 1970) published by Honeywell for that computer. Upon a signal from the control computer 22 the H112 branches to the location START. The logic and arithmetic carried out (whether used for offset, inscribed arc, or both) is exactly the same as that already described in connection with unit 20. Thus, after each recomputation of $G_{XY}$ and $G_A$ the H112 sends appropriate pulses to servos 24, 25 (location OUTPULSE). When G has changed sign the H112 signals computer 22 by an output control pulse (OCP) and waits on a skip control line instruction (SKP) to restart interpolation along the next path.

The progrm is as follows:

| LOCATION | OPERATION | ADDRESS |
|---|---|---|
| PSEUDOA | EQU | 0'170 |
| PSEUDOB | EQU | 0'172 |
| PSEUDOC | EQU | 0'174 |
| PSEUDOD | EQU | 0'176 |
| DELTAX | BSS | 4 |
| DELTAY | BSS | 4 |
| X | BSS | 4 |
| Y | BSS | 4 |
| F | BSS | 4 |
| XR | BSS | 4 |
| YR | BSS | 4 |
| G | BSS | 4 |
| W | BSS | 4 |
| WORK1 | DATA | ** |
| WORK2 | DATA | ** |
| WORK3 | DATA | ** |
| CA | DATA | ** |
| LA | DATA | ** |
| GA | DATA | ** |
| CXY | DATA | ** |
| GXY | DATA | ** |
| LXY | DATA | ** |
| PM | DATA | ** |
| RM | DATA | ** |
| FUNC1 | DATA | ** |
| FUNC2 | DATA | ** |
| START | JST | GETVALS |
|  | LDA | G |
|  | LGR | 11 |
|  | STA | PREVG |
| S00 | JST | GENLXY |
|  | JST | GENLA |
|  | JST | GENCXY |
|  | JST | GENCA |
|  | JST | GENGXY |
|  | JST | GENGA |
|  | LDA | PM |
|  | SNZ |  |
|  | JMP | *+3 |
|  | JST | PMONE |
|  | JMP | S01 |
|  | JST | PMZERO |
| S01 | LDA | RM |
|  | SNZ |  |
|  | JMP | *+3 |
|  | JST | RMONE |
|  | JMP | S02 |
|  | JST | RMZERO |
| S02 | JST | OUTREGS |
|  | LDA | G |

```
              LGR       11
              TCA
              ADD       PREVG
              SNZ
              JMP       S00
              OCP       CTRLCOMP
              SKS       CTRLCOMP
              JMP       *-1
              JMP       START
PREVG         DATA      **
GENCA         DATA      **
              LDA       Y
              OCA
              STA       WORK1
              LDA       F
              OCA
              ANA       WORK1
              STA       WORK1
              LDA       X
              ANA       F
              STA       WORK2
              LDA       WORK1
              OCA
              ANA       WORK2
              ADD       WORK1
              ANA       W
              STA       WORK1
              LDA       Y
              ANA       F
              STA       WORK2
              LDA       X
              OCA
              STA       WORK3
              LDA       F
              ANA       WORK3
              STA       WORK3
              LDA       WORK3
              OCA
              ANA       WORK2
              ADD       WORK3
              STA       WORK2
              LDA       W
              OCA
              ANA       WORK2
              STA       WORK2
              LDA       WORK1
              OCA
              ANA       WORK2
              ADD       WORK1
              LGR       11
              STA       GA
              JMP*      GENCA
GENLA         DATA      **
              LDA       DELTAX
```

```
                ANA       F
                STA       WORK1
                LDA       F
                OCA
                ANA       DELTAY
                STA       WORK2
                LDA       WORK1
                OCA
                ANA       WORK2
                ADD       WORK1
                LGR       11
                STA       LA
                JMP*      GENLA
GENCXY          DATA      **
                LDA       W
                ANA       HIBIT
                ADD       X
                ANA       HIBIT
                ADD       Y
                OCA
                ANA       HIBIT
                ADD       F
                LGR       11
                STA       CXY
                JMP*      GENCXY
GENLXY          DATA      **
                LDA       DELTAX
                ANA       HIBIT
                ADD       DELTAY
                OCA
                ANA       HIBIT
                ADD       F
                OCA
                LGR       11
                STA       LXY
                JMP*      GENLXY
HIBIT           DATA      0'4000
GENGA           DATA      **
                LDA       PM
                OCA
                ANA       LA
                STA       WORK1
                LDA       PM
                ANA       CA
                STA       WORK2
                OCA
                ANA       WORK1
                ADD       WORK2
                STA       GA
                JMP*      GENGA
GENGXY          DATA      **
                LDA       PM
                OCA
                ANA       LXY
```

|          | STA    | WORK1    |
|----------|--------|----------|
|          | LDA    | PM       |
|          | ANA    | CXY      |
|          | STA    | WORK2    |
|          | OCA    |          |
|          | ANA    | WORK1    |
|          | ADD    | WORK2    |
|          | STA    | GXY      |
|          | JMP*   | GENGXY   |
| GETVALS  | DATA   | **       |
|          | LDA    | M20      |
|          | STA    | COUNT    |
|          | LDA    | BLKAD    |
|          | STA    | BLKPTR   |
| INLOOP   | INA    | CTRLCOMP |
|          | STA*   | BLKPTR   |
|          | IRS    | BLKPTR   |
|          | IRS    | COUNT    |
|          | JMP    | INLOOP   |
|          | JMP*   | GETVALS  |
| M20      | DATA   | -20      |
| COUNT    | DATA   | **       |
| BLKAD    | DATA   | Y        |
| BLKPTR   | DATA   | **       |
| CTRLCOMP | EQU    | 01       |
| MOTOR    | EQU    | 10       |
| OUTREGS  | DATA   | **       |
|          | LDA    | MM20     |
|          | STA    | COUNTO   |
|          | LDA    | BLKDO    |
|          | STA    | BLKPTRO  |
| OUTLOOP  | LDA*   | BLKPTRO  |
|          | OTA    | CTRLCOMP |
|          | IRS    | COUNTO   |
|          | JMP    | OUTLOOP  |
|          | LDA    | GA       |
|          | ANA    | 04000    |
|          | LGR    | 11       |
|          | STA    | TEMPO    |
|          | LDA    | GXY      |
|          | ANA    | 04000    |
|          | LGR    | 10       |
|          | ADD    | TEMPO    |
|          | ADD    | PLSTABA  |
|          | STA    | TEMPO    |
|          | LDA*   | TEMPO    |
|          | OTA    | MOTOR    |
|          | JMP*   | OUTREGS  |
| MM20     | DATA   | -20      |
| COUNTO   | DATA   | **       |
| BLKADO   | DATA   | DELTAX   |
| 04000    | DATA   | **       |
| TEMPO    | DATA   | 0'4000   |
| PLSTABA  | DATA   | **       |
| PULSTB   | DATA   | PULSTB   |

|       | DATA  | 1       |
|-------|-------|---------|
|       | DATA  | 2       |
|       | DATA  | 4       |
|       | DATA  | 8       |
|       | BSS   | 3       |
| PMONE | DATA  | **      |
|       | LDA   | CXY     |
|       | RAR   | 11      |
|       | ADD   | CA      |
|       | ADD   | PMOTBL  |
|       | STA   | PMONE-2 |
|       | ADD   | P4      |
|       | STA   | PMONE-1 |
|       | LDA*  | PMONE-2 |
|       | SMI   |         |
|       | JMP   | PM07    |
|       | TCA   |         |
|       | STA   | PM01    |
|       | STA   | PM02    |
|       | LDA   | AQPSUB  |
| PM05  | STA   | FUNC1   |
|       | LDA*  | PMONE-1 |
|       | SMI   |         |
|       | JMP   | PM08    |
|       | TCA   |         |
|       | STA   | PM03    |
|       | STA   | PM04    |
|       | LDA   | AQPSUB  |
| PM06  | STA   | FUNC2   |
|       | JST   | LOADAB  |
| PM01  | DATA  | **      |
|       | JST   | LOADCD  |
| PM02  | DATA  | **      |
|       | JST   | QPADD   |
|       | JST   | STORAB  |
|       | DATA  | PSEUDOC |
|       | JST   | LOADAB  |
|       | DATA  | F       |
|       | JST*  | FUNC1   |
|       | JST   | LOADCD  |
|       | DATA  | QPONE   |
|       | JST   | QPADD   |
|       | JST   | STORAB  |
|       | DATA  | F       |
|       | JST   | LOADAB  |
| PM03  | DATA  | **      |
|       | JST*  | FUNC2   |
|       | JST   | STORAB  |
| PM04  | DATA  | **      |
|       | JMP*  | PMONE   |
| PM07  | STA   | PM01    |
|       | STA   | PM02    |
|       | LDA   | AQPADD  |
|       | JMP   | PM05    |
| PM08  | STA   | PM03    |

|         |       |          |
|---------|-------|----------|
|         | STA   | PM04     |
|         | LDA   | AQPADD   |
|         | JMP   | PM06     |
| PMOTBL  | DATA  | *+1      |
|         | DATA  | X        |
|         | DATA  | -X       |
|         | DATA  | Y        |
|         | DATA  | -Y       |
|         | DATA  | X        |
|         | DATA  | -X       |
|         | DATA  | Y        |
|         | DATA  | -Y       |
|         | DATA  | **       |
| RMZERO  | DATA  | **       |
|         | LDA   | GXY      |
|         | RAR   | 11       |
|         | ADD   | GA       |
|         | ADD   | RMZTBL   |
|         | STA   | RMZERO-1 |
|         | LDA*  | RMZERO-1 |
|         | SMI   |          |
|         | JMP   | RMZ3     |
|         | TCA   |          |
|         | STA   | RMZ1     |
|         | LDA   | AQPSUB   |
| RMZ2    | STA   | FUNC1    |
|         | JST   | LOADAB   |
|         | DATA  | G        |
|         | JST   | LOADCD   |
| RMZ1    | DATA  | **       |
|         | JST*  | FUNC1    |
|         | JST   | STORAB   |
|         | DATA  | G        |
|         | JMP*  | RMZERO   |
| RMZ3    | STA   | RMZ1     |
|         | LDA   | AQPADD   |
|         | JMP   | RMZ2     |
| RMZTBL  | DATA  | *+1      |
|         | DATA  | -YR      |
|         | DATA  | YR       |
|         | DATA  | XR       |
|         | DATA  | -XR      |
|         | BSS   | 2        |
| PMZERO  | DATA  | **       |
|         | LDA   | LXY      |
|         | RAR   | 11       |
|         | ADD   | LA       |
|         | ADD   | PMZTBL   |
|         | STA   | PMZERO-2 |
|         | ADD   | P4       |
|         | STA   | PMZERO-1 |
|         | LDA*  | PMZERO-2 |
|         | SMI   |          |
|         | JMP   | PMZ7     |
|         | TCA   |          |

|         |       |           |
|---------|-------|-----------|
|         | STA   | PMZ1      |
|         | LDA   | AQPSUB    |
| PMZ2    | STA   | FUNC1     |
|         | LDA*  | PMZERO-1  |
|         | SMI   |           |
|         | JMP   | PMZ8      |
|         | TCA   |           |
|         | STA   | PMZ4      |
|         | STA   | PMZ5      |
|         | LDA   | AQPSUB    |
| PMZ6    | STA   | FUNC2     |
|         | JST   | LOADAB    |
|         | DATA  | F         |
|         | JST   | LOADCD    |
| PMZ1    | DATA  | **        |
|         | JST*  | FUNC1     |
|         | JST   | STORAB    |
|         | DATA  | F         |
|         | JST   | LOADAB    |
| PMZ4    | DATA  | **        |
|         | JST   | LOADCD    |
|         | DATA  | QPONE     |
|         | JST*  | FUNC2     |
|         | JST   | STORAB    |
| PMZ5    | DATA  | **        |
|         | JMP*  | PMZERO    |
| PMZ7    | STA   | PMZ1      |
|         | LDA   | AQPADD    |
|         | JMP   | PMZ2      |
| PMZ8    | STA   | PMZ4      |
|         | STA   | PMZ5      |
|         | LDA   | AQPADD    |
|         | JMP   | PMZ6      |
| AQPADD  | DATA  | QPADD     |
| AQPSUB  | DATA  | QPSUB     |
| QPONE   | DATA  | 0         |
|         | DATA  | 0         |
|         | DATA  | 0         |
|         | DATA  | 1         |
| PMZTBL  | DATA  | *+1       |
|         | DATA  | -DELTAY   |
|         | DATA  | DELTAY    |
|         | DATA  | DELTAX    |
|         | DATA  | -DELTAX   |
|         | DATA  | X         |
|         | DATA  | -X        |
|         | DATA  | Y         |
|         | DATA  | -Y        |
| P4      | DATA  | 4         |
|         | BSS   | 3         |
| RMONE   | DATA  | **        |
|         | LDA   | GXY       |
|         | RAR   | 11        |
|         | ADD   | GA        |
|         | ADD   | RMOTBL    |

```
                STA         RMONE-2
                ADD         P4
                STA         RMONE-1
                LDA*        RMONE-2
                SMI
                JMP         RM07
                TCA
                STA         RM01
                STA         RM02
                LDA         AQPSUB
RM05            STA         FUNC1
                LDA*        RMONE-1
                SMI
                JMP         RM08
                TCA
                STA         RM03
                STA         RM04
                LDA         AQPSUB
RM06            STA         FUNC2
                JST         LOADAB
RM01            DATA        **
                JST         LOADCD
RM02            DATA        **
                JST         QPADD
                JST         STORAB
                DATA        PSEUDOC
                JST         LOADAB
                DATA        G
                JST*        FUNC1
                JST         LOADCD
                DATA        QPONE
                JST         QPADD
                JST         STORAB
                DATA        G
                JST         LOADAB
RM03            DATA        **
                JST*        FUNC2
                JST         STORAB
RM04            DATA        **
                JMP*        RMONE
RM07            STA         RM01
                STA         RM02
                LDA         AQPADD
                JMP         RM05
RM08            STA         RM03
                STA         RM04
                LDA         AQPADD
                JMP         RM06
RMOTBL          DATA        *+1
                DATA        XR
                DATA        -XR
                DATA        YR
                DATA        -YR
                DATA        XR
                DATA        -XR
```

```
           DATA    YR
           DATA    -YR
QPZERO     DATA    **
           DATA    **
           DATA    **
           DATA    **
QPM1       DATA    -1
           DATA    -1
           DATA    -1
           DATA    -1
QPADD      DATA    **
           LDA     QPADD
           STA     DPADD
           LDA     SKP
           JMP     ADDIN
DPADD      DATA    **
           LDA     NOP
ADDIN      STA     BREAK1
           TOA
BREAK1     ***     **
           JMP     ADD1
           LDA     PSEUDOD+1
           ADD     PSEUDOB+1
           STA     PSEUDOB+1
           TOA
           ADD     PSEUDOD
           ADD     PSEUDOB
           STA     PSEUDOB
ADD1       TOA
           ADD     PSEUDOC+1
           ADD     PSEUDOA+1
           STA     PSEUDOA+1
           TOA
           ADD     PSEUDOC
           ADD     PSEUDOA
           STA     PSEUDOA
           JMP*    DPADD
QPSUB      DATA    **
           LDA     QPSUB
           STA     DPSUB
           LDA     SKP
           JMP     SUBIN
DPSUB      DATA    **
           LDA     NOP
SUBIN      STA     BREAK2
           TOA
BREAK2     ***     **
           JMP     SUB1
           LDA     PSEUDOD+1
           OCA
           ADD     SUBP1
           ADD     PSEUDOB+1
           STA     PSEUDOB+1
           SNO
           IRS     PSEUDOB
```

```
                JMP         *+5
                IRS         PSEUDOA+1
                JMP         *+3
                IRS         PSEUDOA
                NOP
                LDA         PSEUDOD
                OCA
                ADD         PSEUDOB
                STA         PSEUDOB
                SNO
                IRS         PSEUDOA+1
                JMP         *+3
                IRS         PSEUDOA+1
                JMP         *+3
                IRS         PSEUDOA
                NOP
                LDA         PSEUDOC+1
                OCA
SUB1A           EQU         *
                ADD         PSEUDOA+1
                STA         PSEUDOA+1
                SNO
                IRS         PSEUDOA
NOP             NOP
                LDA         PSEUDOC
                OCA
                ADD         PSEUDOA
                STA         PSEUDOA
                JMP*        DPSUB
SUB1            LDA         PSEUDOC+1
                OCA
                ADD         SUBP1
                JMP         SUB1A
DPMPY           DATA        **
                LDA         PSEUDOA
                SMI
                JMP         SPM01
                JST         PCTCA
                JST         DPTCA
DPM01           EQU         *
                LDA         PSEUDOA
                STA         PSEUDOB
                LDA         PSEUDOA+1
                STA         PSEUDOB+1
                CRA
                STA         PSEUDOA
                STA         PSEUDOA+1
                STA         DPTCA
                LDA         M24
                STA         DPMWRK1
DPM02           EQU         *
                LDA         PSEUDOB+1
                RAR         1
                SPL
                JMP         MPADD
```

| | | |
|---|---|---|
| DPM03 | EQU | * |
| | JST | LGRS |
| | LDA | PSEUDOA |
| | ADD | DPTCA |
| | STA | PSEUDOA |
| | IRS | DPMWRK1 |
| | JMP | DPM02 |
| | JMP* | DPMPY |
| MPADD | JST | DPADD |
| | LDA | PSEUDOC |
| | ANA | 04000 |
| | STA | DPTCA |
| | JMP | DPM03 |
| 04000 | DATA | O'4000 |
| DPTCA | DATA | ** |
| | TOA | |
| | LDA | PSEUDOA+1 |
| | OCA | |
| | ADD | SUBP1 |
| | STA | PSEUDOA+1 |
| | LDA | PSEUDOA |
| | OCA | |
| | SNO | |
| | ADD | SUBP1 |
| | STA | PSEUDOA |
| | JMP* | DPTCA |
| SUBP1 | DATA | 1 |
| SKP | SKP | |
| M24 | DATA | -D'24 |
| DPMWRK1 | BSS | 1 |
| PCTCA | DATA | ** |
| | TOA | |
| | LDA | PSEUDOC+1 |
| | OCA | |
| | ADD | TCAP1 |
| | STA | PSEUDOC+1 |
| | LDA | PSEUDOC |
| | OCA | |
| | SNO | |
| | ADD | TCAP1 |
| | STA | PSEUDOC |
| | JMP* | PCTCA |
| DPDWRK1 | DATA | ** |
| DPDWRK2 | DATA | ** |
| DPDVS | BSS | 2,0 |
| DIVM24 | DATA | -24 |
| TCAP1 | EQU | * |
| DPONE | DATA | 1 |
| DIVT | HLT | |
| LGRS | DATA | ** |
| | LDA | M4 |
| | STA | POP |
| | LDA | PADRA |
| | STA | MOVE |
| | TOA | |

```
LGRAS       TOA
            RAR     1
            STA     QTEMP
            LDA*    MOVE
            LGR     1
            ADD     QTEMP
            STA*    MOVE
            IRS     MOVE
            IRS     POP
            JMP     LGRAG
            JMP*    LGRS
            END
```

Other embodiments (e.g., generalization to include tool drive along a Z axis, modification of the equations to correspond to paths which are neither circular nor linear, etc.) are within the following claims.

What is claimed is:

1. A method for control of a tool drive with respect to at least X and Y axes to trace a first path segment and to approach a second path segment, by steps comprising storage of data descriptive of X and Y positions corresponding to current X and Y tool positions and of a first function the value of which is dependent upon the perpendicular distance from said X and Y positions to said second path segment, updating of the stored data upon advance of said drive during the tracing of said first path segment, and interruption of the tracing of said first path segment when said function assumes a predetermined value different from zero.

2. The method of claim 1 wherein said predetermined value corresponds to a desired tool offset for said second path segment, and said X and Y positions are said current tool positions.

3. The method of claim 1 wherein said X and Y positions are pseudo tool positions on a pseudo path segment parallel to said first path segment and intersecting the center of an inscribed curve to be traced tangent to said first and second path segments, and said predetermined value corresponds to the distance between said first and pseudo path segments.

4. The method of claim 3 wherein said inscribed curve is a circular arc, and said pseudo path segment is spaced from said first path by the radius of said arc.

5. The method of claim 1 wherein said tracing of said first path segment is interrupted when the value of said function changes its algebraic sign.

6. The method of claim 1 wherein the stored value of said function is updated according to the following table, where said second path segment is a line segment between points $(X_1, Y_1)$ and $(X_2, Y_2)$, and said function is of the form $H = \Delta X \cdot Y = \Delta Y \cdot X + (X_1 \cdot Y_2 - X_2 \cdot Y_1)$, where $\Delta X = X_2 - X_1$ and $\Delta Y = Y_2 - Y_1$:

| UNIT DRIVE ADVANCE | VALUE OF H UPDATING |
|---|---|
| +X | +$\Delta Y$ |
| -X | +$\Delta Y$ |
| -Y | +$\Delta X$ |

7. The method of claim 1 wherein the stored value of said function is updated according to the following table, where said second path segment is a circular arc having a center $(X_C, Y_C)$ and endpoints $(X_1, Y_1)$, $(X_2, Y_2)$, and said function is of the form $H = (X-X_C)^2 + (Y-Y_C)^2$:

| UNIT DRIVE ADVANCE | VALUE OF H UPDATING |
|---|---|
| +X | $+2(X-X_c)+1$ |
| +Y | $+2(Y-Y_c)+1$ |
| -X | $-2(X-X_c)+1$ |
| -Y | $-2(Y-Y_c)+1$ |

8. The method of claim 1, said steps further comprising storage of additional data descriptive of a second function the value of which is dependent upon the perpendicular distance from current tool position to said first path segment, updating of the additional stored data upon advance of said drive during the tracing of said first path segment, and control of said advance so that the value of said second function tends toward a predetermined constant value corresponding to a desired tool offset.

* * * * *

UNITED STATES PATENT OFFICE
CERTIFICATE OF CORRECTION

Patent No. 3,770,947  Dated November 6, 1973

Inventor(s) Don Deily

It is certified that error appears in the above-identified patent and that said Letters Patent are hereby corrected as shown below:

Column 3, line 44, "S$\Delta$X" should be --$S_{\Delta X}$--. Column 3, line 45, "S$\Delta$Y" should be --$S_{\Delta Y}$--. Column 4, line 32, "32(Y)" should be --32(X)--. Column 4, line 54, "0" at left margin should be in line with the rest of the column.

Column 32, line 21, "H = $\Delta$X·Y = $\Delta$Y·X + ($X_1$·$Y_2$ - $X_2$·$Y_1$)" should be --H = $\Delta$X·Y - $\Delta$Y·X + ($X_1$·$Y_2$ - $X_2$·$Y_1$)--. Column 32, lines 23 through 26, "UNIT DRIVE ADVANCE    VALUE OF H UPDATING"

| UNIT DRIVE ADVANCE | VALUE OF H UPDATING |
|---|---|
| +X | +Y |
| -X | +$\Delta$Y |
| -Y | +$\Delta$X | should be  --UNIT DRIVE ADVANCE    VALUE OF H UPDATING--

| UNIT DRIVE ADVANCE | VALUE OF H UPDATING |
|---|---|
| +X | -$\Delta$Y |
| +Y | +$\Delta$X |
| -X | +$\Delta$Y |
| -Y | -$\Delta$X |

Signed and sealed this 12th day of November 1974.

(SEAL)
Attest:

McCOY M. GIBSON JR.
Attesting Officer

C. MARSHALL DANN
Commissioner of Patents